US011784353B2

(12) United States Patent
Okamoto et al.

(10) Patent No.: US 11,784,353 B2
(45) Date of Patent: Oct. 10, 2023

(54) ALL-SOLID STATE SECONDARY CELL AND PRODUCTION METHOD FOR THE SAME

(71) Applicant: HITACHI ZOSEN CORPORATION, Osaka (JP)

(72) Inventors: Kenji Okamoto, Osaka (JP); Hideyuki Fukui, Osaka (JP)

(73) Assignee: HITACHI ZOSEN CORPORATION, Osaka (JP)

( * ) Notice: Subject to any disclaimer, the term of this patent is extended or adjusted under 35 U.S.C. 154(b) by 248 days.

(21) Appl. No.: 16/468,111

(22) PCT Filed: Dec. 15, 2017

(86) PCT No.: PCT/JP2017/045048
§ 371 (c)(1),
(2) Date: Jul. 29, 2019

(87) PCT Pub. No.: WO2018/110688
PCT Pub. Date: Jun. 21, 2018

(65) Prior Publication Data
US 2020/0076002 A1 Mar. 5, 2020

(30) Foreign Application Priority Data
Dec. 16, 2016 (JP) ................ 2016-243870

(51) Int. Cl.
H01M 10/0585 (2010.01)
H01M 10/0562 (2010.01)
(Continued)

(52) U.S. Cl.
CPC ... *H01M 10/0585* (2013.01); *H01M 10/0562* (2013.01); *H01M 10/0565* (2013.01); *H01M 50/574* (2021.01); *H01M 2004/021* (2013.01)

(58) Field of Classification Search
CPC ......... H01M 10/0585; H01M 10/0562; H01M 10/0565
See application file for complete search history.

(56) References Cited

U.S. PATENT DOCUMENTS

2009/0017371 A1 1/2009 Nakamura
2009/0269665 A1 10/2009 Nakamura
(Continued)

FOREIGN PATENT DOCUMENTS

CN 101461086 A 6/2009
CN 101517810 A 8/2009
(Continued)

OTHER PUBLICATIONS

Machine Translation of JP2014222564A. (Year: 2014).*
(Continued)

Primary Examiner — Jonathan G Jelsma
(74) Attorney, Agent, or Firm — Pillsbury Winthrop Shaw Pittman, LLP

(57) ABSTRACT

The present invention provides an all-solid state secondary cell equipped with: a positive electrode collector; a negative electrode collector; and a powder laminate placed between the positive electrode collector and the negative electrode collector. The powder laminate has: a positive electrode powder layer; a negative electrode powder layer; and solid electrolyte layers that are placed between the positive electrode powder layer and the negative electrode powder layer, and also cover the outer periphery of the positive electrode powder layer and the negative electrode powder layer. The powder laminate comprises a peripheral edge part, and a center part surrounded by this peripheral edge part. The thickness of the peripheral edge part is the thickness of the center part or greater.

16 Claims, 14 Drawing Sheets

(51) Int. Cl.
*H01M 10/0565* (2010.01)
*H01M 50/574* (2021.01)
*H01M 4/02* (2006.01)

(56) References Cited

U.S. PATENT DOCUMENTS

| | | |
|---|---|---|
| 2010/0035157 A1 | 2/2010 | Nakamura |
| 2013/0093398 A1 | 4/2013 | Takabayashi et al. |
| 2013/0209878 A1 | 8/2013 | Nakahara et al. |
| 2013/0212875 A1* | 8/2013 | Takahata .............. H01M 4/04 29/623.5 |
| 2013/0344357 A1* | 12/2013 | Miyake ............. H01M 10/0585 29/623.2 |
| 2017/0207465 A1* | 7/2017 | Nishimura ........ H01M 10/0436 |
| 2018/0198169 A1 | 7/2018 | Fukui et al. |

FOREIGN PATENT DOCUMENTS

| | | |
|---|---|---|
| CN | 101569030 A | 10/2009 |
| CN | 103050647 A | 4/2013 |
| CN | 103190015 A | 7/2013 |
| EP | 3316382 A1 | 5/2018 |
| EP | 3451435 A1 | 3/2019 |
| JP | 62-165880 A | 7/1987 |
| JP | 2001-160413 A | 6/2001 |
| JP | 2011-096550 A | 5/2011 |
| JP | 2011-124084 A | 6/2011 |
| JP | 2013-054949 A | 3/2013 |
| JP | 2013-243004 A | 12/2013 |
| JP | 2014-127463 A | 7/2014 |
| JP | 2014222564 A * | 11/2014 |
| JP | 2016-018704 A | 2/2016 |
| JP | 2016-192265 A | 11/2016 |
| WO | 2016/208271 | 12/2016 |

OTHER PUBLICATIONS

International Search Report dated Feb. 6, 2018 issued in corresponding International Application No. PCT/JP2017/045048 with English translation.

Extended European Search Report dated Dec. 3, 2019 issued in corresponding European Patent Application No. 17880551.1.

First Office Action dated Sep. 24, 2021, issued in corresponding Chinese Patent Application No. 201780077625.X with English translation (15 pgs.).

Decision to Grant a Patent dated Sep. 20, 2022, issued in corresponding Japanese Patent Application No. 2021-139489 with English translation (5 pgs ).

Request for the Submission of an Opinion dated Sep. 1, 2022, issued in corresponding Korean Patent Application No. 10-2019-7019848 with English translation (13 pgs).

* cited by examiner

ALL-SOLID STATE SECONDARY CELL AND PRODUCTION METHOD FOR THE SAME

CROSS-REFERENCE TO RELATED APPLICATIONS

This Application is the U.S. National Stage of PCT/JP2017/045048, filed Dec. 15, 2017, which claims priority to Japanese Patent Application No. 2016-243870, filed Dec. 16, 2016, the contents of each of which are incorporated herein by reference in entirety.

TECHNICAL FIELD

The present invention relates to an all-solid state secondary cell and production method for the same.

BACKGROUND ART

Typically, the all-solid state secondary cell, a solid electrolyte layer is disposed between a positive electrode powder layer and a negative electrode powder layer, and a positive electrode collector and a negative electrode collector are disposed on the outer surfaces of the positive electrode powder layer and the negative electrode powder layer, respectively.

In such an all-solid state secondary cell, the cell has been proposed wherein the outer side surface of the solid electrolyte layer outside the outer side surfaces of the positive electrode powder layer and the negative electrode powder layer, and the content of the solid electrolyte in the peripheral edge part of the solid electrolyte layer is smaller than in the center part (for example, refer to Patent Literature 1). The all-solid state secondary cell proposed by this Patent Literature 1 can suppress a short circuit between the positive and negative electrodes while keeping production costs down.

CITATION LIST

Patent Literature

Patent Literature 1: Japanese Patent Laid-Open No. 2013-243004

SUMMARY OF INVENTION

Technical Problem

In the all-solid state secondary cell having the positive electrode powder layer, the negative electrode powder layer, and the solid electrolyte layer, each of the powder layer is laminated and hence the laminate is collapsible when formed by pressing. Particularly, In the positive electrode powder layer, the negative electrode powder layer, and the solid electrolyte layer of the all-solid state secondary cell disclosed in Patent Literature 1 described above, the total thickness of the end part of each layer is different, the forming pressure is also different, the end part of the laminate is not consolidated compared to the center thereof, and thereby the strength of each layer is weak. Therefore, in pressing the laminate, the end part is collapsible to cause a short circuit.

An object of the present invention is to provide an all-solid state secondary cell capable of preventing a short circuit between positive and negative electrodes and a production method of the same.

Solution to Problem

In order to solve the above problem, the all-solid state secondary cell according to a first aspect is an all-solid state secondary cell including a positive electrode collector, a negative electrode collector, and a powder laminate disposed between the positive electrode collector and the negative electrode collector, wherein the powder laminate has a positive electrode powder layer and a negative electrode powder layer, and a solid electrolyte layer disposed between the positive electrode powder layer and the negative electrode powder layer, the solid electrolyte layer covering outer peripheries of the positive electrode powder layer and the negative electrode powder layer;

the powder laminate includes a peripheral edge part and a center part surrounded by the peripheral edge part; and a thickness of the peripheral edge part is equal to or greater than a thickness of the center part.

In the all-solid state secondary cell according to a second aspect, the thickness of the peripheral edge part of the all-solid state secondary cell according to the first aspect is greater than the thickness of the center part.

The all-solid state secondary cell according to third aspect is an all-solid state secondary cell including a positive electrode collector, a negative electrode collector, and a powder laminate disposed between the positive electrode collector and the negative electrode collector, wherein the powder laminate has a positive electrode powder layer, a negative powder layer, a solid electrolyte layer disposed between the positive electrode powder layer and the negative electrode powder layer, and a hydrogen sulfide adsorption layer and/or a moisture adsorption layer covering an outer periphery of the positive electrode powder layer or the negative electrode powder layer;

the powder laminate includes a peripheral edge part and a center part surrounded by the peripheral edge part; and a thickness of the peripheral edge part is equal to or greater than a thickness of the center part.

Additionally, in the all-solid state secondary cell according to a fourth aspect, the thickness of the peripheral edge part of the all-solid state secondary cell according to the third aspect is greater than the thickness of the center part.

The production method of the all-solid state secondary cell according to a fifth aspect is a production method of the all-solid state secondary cell according to the first or second aspect, including:

bonding an insulating member having an opening part formed therein on a surface of the positive electrode collector/negative electrode collector;

disposing the positive electrode powder layer/negative electrode powder layer in the opening part of the insulating member bonded to the surface of the positive electrode collector/negative electrode collector;

disposing a lower part and middle part of the solid electrolyte layer on the surface of the insulating member so as to bury the positive electrode powder layer/negative electrode powder layer disposed in the opening part of the insulating member;

disposing an upper part of the solid electrolyte layer on a surface of the middle part of the solid electrolyte layer so as to form a space part and cover an outer periphery of the space part;

disposing the negative electrode powder layer/positive electrode powder layer in the space part, the outer periphery of which is covered with the upper part of the solid electrolyte layer;

disposing the negative electrode collector/positive electrode collector on a surface of the upper part of the solid electrolyte layer and on a surface of the negative electrode powder layer/positive electrode powder layer; and pressing the positive electrode collector and the negative electrode collector in a direction in which the collectors are brought close to each other.

The production method of the all-solid state secondary cell of a sixth aspect is a production method according to the first or second aspect, including:

bonding an insulating member having an opening part formed therein on the surface of the positive electrode collector/negative electrode collector;

disposing the positive electrode powder layer/negative electrode powder layer in the opening part of the insulating member bonded to the surface of the positive electrode collector/negative electrode collector;

disposing a lower part and middle part of the solid electrolyte layer on a surface of the insulating member so as to bury the positive electrode powder layer/negative electrode powder layer disposed in the opening part of the insulating member;

disposing the negative electrode powder layer/positive electrode powder layer on a surface of the middle part of the solid electrolyte layer;

disposing the upper part of the sold electrolyte layer on the surface of the middle part of the solid electrolyte layer so as to cover an outer periphery of the disposed negative electrode powder layer/positive electrode powder layer;

disposing the negative electrode collector/positive electrode collector on a surface of the upper part of the sold electrolyte layer and on a surface of the negative electrode powder layer/positive electrode powder layer; and pressing the positive electrode collector and negative electrode collector in a direction in which the collectors are brought close to each other.

The production method of an all-solid secondary cell according to a seventh aspect is a production method of the all-solid secondary cell according to the third or fourth aspect, including:

bonding the insulating member having the opening part formed therein on a surface of the positive electrode collector/negative electrode collector;

disposing the positive electrode powder layer/negative electrode powder layer in the opening part of the insulating member bonded to the surface of the positive electrode collector/negative electrode collector;

disposing the solid electrolyte layer on a surface of the insulating member so as to bury the positive electrode powder layer/negative electrode powder layer disposed in the opening part of the insulating member;

disposing a hydrogen sulfide adsorption layer and/or a moisture adsorption layer on a surface of the solid electrolyte layer so as to form a space part and cover an outer periphery of the space part;

disposing the negative electrode powder layer/positive electrode powder layer in the space part, the outer periphery of which is covered by the hydrogen sulfide adsorption layer and/or the moisture adsorption layer;

disposing the negative electrode collector/positive electrode collector on a surface of the hydrogen sulfide adsorption layer and/or the moisture adsorption layer and on a surface of the negative electrode powder layer/positive electrode powder layer; and pressing the positive electrode collector and the negative electrode collector in a direction to approach these electrodes each other.

The production method of the all-solid secondary cell according to an eighth aspect is a production method of the all-solid secondary cell according to the third or fourth aspect, having:

bonding the insulating member having the opening part formed therein on the surface of the positive electrode collector/negative electrode collector;

disposing the positive electrode powder layer/negative electrode powder layer in the opening part of the insulating member bonded to the surface of the positive electrode collector/negative electrode collector;

disposing the solid electrolyte layer on a surface of the insulating member so as to bury the positive electrode powder layer/negative electrode powder layer disposed in the opening part of the insulating member;

disposing the negative electrode powder layer/positive electrode powder layer on a surface of the solid electrolyte layer;

disposing the hydrogen sulfide adsorption layer and/or the moisture adsorption layer on the surface of the solid electrolyte layer so as to cover the outer periphery of the disposed negative electrode powder layer/positive electrode powder layer;

disposing the negative electrode collector/positive electrode collector on a surface of the hydrogen sulfide adsorption layer and/or the water adsorption layer and on a surface of the negative electrode powder layer/positive electrode powder layer; and pressing the positive electrode collector and negative electrode collector in a direction to approach these electrodes each other.

The production method of the all-solid secondary cell according to a ninth aspect is a production method of the all-solid secondary cell according to any of the fifth to eighth aspects, wherein the all-solid state secondary cell includes an outer peripheral member disposed on the outer periphery of the powder laminate, and the pressing the positive electrode collector and the negative electrode collector in a direction in which the collectors are brought close to each other generates an equal pressure on both the powder laminate and the outer peripheral member by the pressing.

The production method of the all-solid secondary cell according to a tenth aspect is a production method of the all-solid secondary cell according to the ninth aspect, wherein the pressing the positive electrode collector and the negative electrode collector in a direction in which the collectors are brought close to each other makes the thickness of the powder laminate equal to the thickness of the outer peripheral member and satisfies the following formula (1):

$$(E1/T1-E2/T2)T'=E1-E2 \qquad (1)$$

where T1 is a thickness of the powder laminate before the pressing, E1 is a modulus of elasticity of the powder laminate, T2 is a thickness of the outer peripheral member before the pressing, E2 is a modulus of elasticity of the outer peripheral member, and T' is a thickness of the powder laminate to be made equal to the thickness of the outer peripheral member by the pressing.

Advantageous Effects of Invention

According to the all-solid state secondary cell and the production method of the same, the outer periphery of the positive electrode powder layer and the negative electrode powder layer is covered by the solid electrolyte layer and the thickness of the peripheral edge part is equal to or greater than that of the center part, allowing to prevent a short circuit between the positive and negative electrodes.

DESCRIPTION OF EMBODIMENTS

Hereinafter, the all-solid state secondary cell according to the embodiments of the present invention and a production method of the same will be described based on the drawings.

The configuration of the above all-solid state secondary cell will be described.

Figure 1:
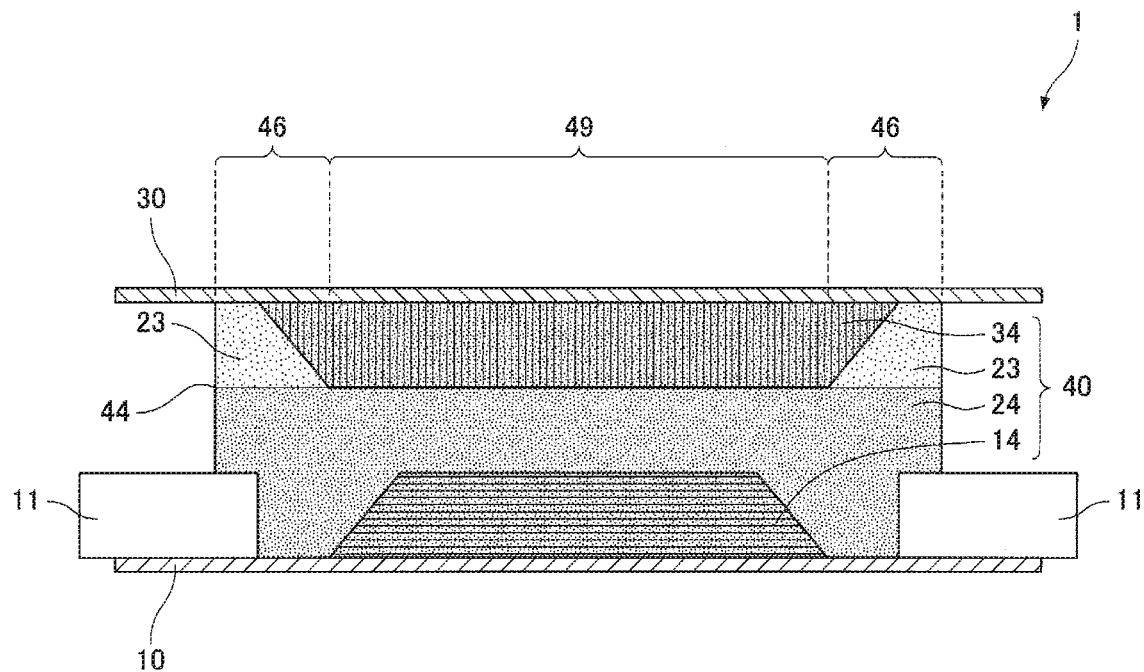
FIG. 1 is a cross-sectional view showing the all-solid state secondary cell according to Embodiment 1 of the present invention.
Figure 2:
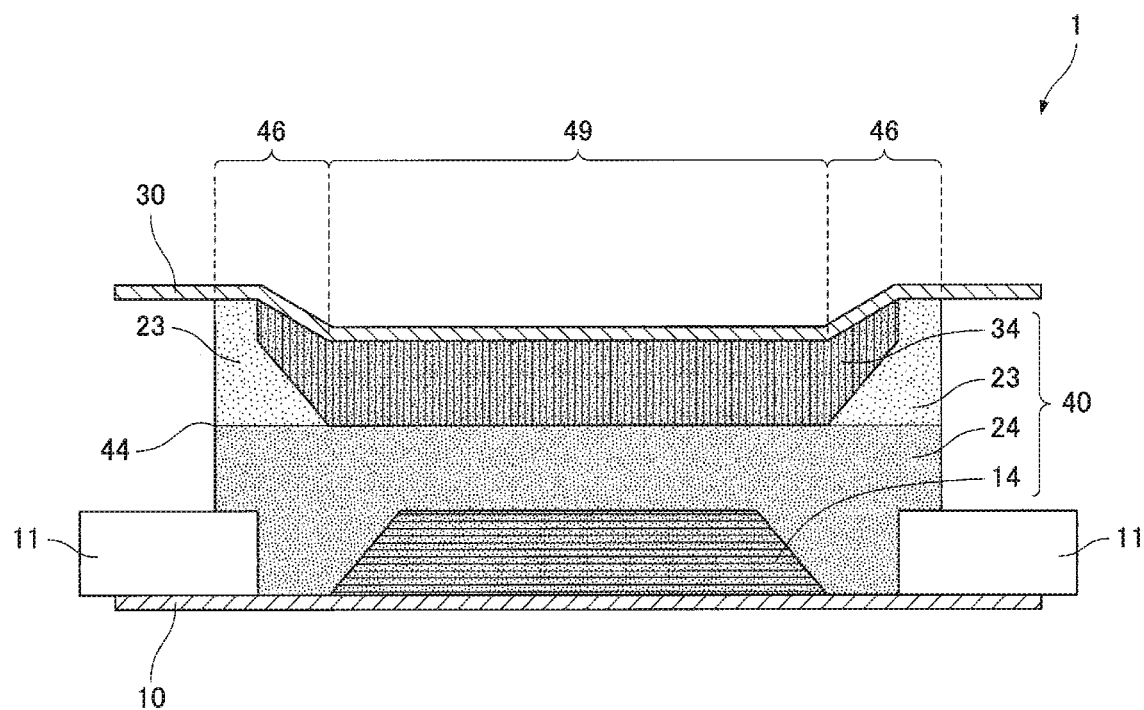
FIG. 2 is a cross-sectional view showing the all-solid state secondary cell according to Embodiment 2 of the present invention.

As shown in FIGS. 1 and 2, this all-solid state secondary cell includes the positive electrode collector and the negative electrode collector 30, and the powder laminate 40 disposed between the positive electrode collector 10 and the negative electrode collector 30. This powder laminate 40 has the positive electrode powder layer 14 disposed on the side of the positive electrode collector 10; the negative electrode powder layer 34 disposed on the side of the negative electrode collector 30; the solid electrolyte layer 24 disposed between the positive electrode powder layer 14 and the negative electrode powder layer 34 and covering the outer periphery of the positive electrode powder layer 14; and the outer peripheral powder layer 23 disposed on the outer periphery of the negative electrode powder layer 34. The positive electrode powder layer 14, the positive electrode collector 10, the negative electrode powder layer 34, and the negative electrode collector 30 are not limited to the positional relationship shown in FIGS. 1 and 2. The positional relationships shown in FIGS. 1 and 2 may be interchanged, that is, the reference numerals 14 and 10 may be the negative electrode powder layer and the negative electrode collector, and the reference numerals 34 and 30 may be the positive electrode powder layer and the positive electrode collector. In the case of interchanging the positional relationship in this way, the solid electrolyte layer 24 covers not the outer periphery of the positive electrode powder layer 14 as shown in FIGS. 1 and 2 but the outer periphery of the negative electrode powder layer, while the outer peripheral powder layer 23 is disposed not on the outer periphery of the negative electrode powder layer 34 as shown in FIGS. 1 and 2 but on the outer periphery of the positive electrode powder layer. The above outer peripheral powder layer 23 may be composed of any powder such as the same powder as the solid electrolyte layer 24 or a powder that suppresses the generation of hydrogen sulfide (a powder that adsorbs hydrogen sulfide). The above outer peripheral powder layer 23 is a part (upper part) of the solid electrolyte layer when composed of the same powder as the solid electrolyte layer 24. In this case, parts indicated by reference numeral 24 are a lower part and middle part of the solid electrolyte layer. The above outer peripheral powder layer 23 is a hydrogen sulfide adsorption layer when composed of a powder that adsorbs hydrogen sulfide; a moisture adsorption layer when composed of powder that adsorbs moisture; and a hydrogen sulfide adsorption layer and moisture adsorption layer when composed of a powder that adsorbs both hydrogen sulfide and moisture. Examples of this powder constituting the hydrogen sulfide adsorption layer and the moisture adsorption layer include porous materials such as zeolite, silica gel, or activated carbon.

As shown in FIGS. 1 and 2, the above powder laminate 40 is composed of a powder without gaps, that is, densely composed of a powder. In the present invention, the outer side surface 44 of the above powder laminate 40 does not include the contact part between the above powder laminate 40 and the insulating member 11 (not an essential component) disposed by inserting from the outer periphery of the powder laminate 40. The above powder laminate 40 consists of the peripheral edge part 46 including the above outer side surface 44 and the center part 49 surrounded by the peripheral edge part 46. The thickness of this peripheral edge part 46 is equal to or greater than the thickness of the center part 49. As a result, the thickness of the above peripheral edge part 46 may be equal to the thickness of the center part 49 as shown in FIG. 1, and the thickness of the above peripheral edge part 46 may exceed the thickness of the center part 49 as shown in FIG. 2.

Hereinafter, the case that the thickness of the above peripheral edge part 46 is equal to the thickness of the above center part 49 (refer to FIG. 1) will be described as [Embodiment 1], and the case that the thickness of the above peripheral edge part 46 is greater than the thickness of the center part 49 (refer to FIG. 2) will be described as [Embodiment 2].

Embodiment 1

As shown in FIG. 1, the all-solid state secondary cell 1 according to Embodiment 1 of the present invention includes the positive electrode collector 10 and the negative electrode collector 30; the powder laminate 40 disposed between the positive electrode collector 10 and the negative electrode collector 30; and the insulating member 11 disposed by being bonded to the surface (upper surface) of the positive electrode collector 10 and inserted from the outer periphery of the powder laminate 40 thereinto.

The above powder laminate 40 consists of the positive electrode powder layer 14 disposed on the side of the positive electrode collector 10 without contacting the insulating member 11; the negative electrode powder layer disposed on the side of the negative electrode collector 30; the lower part and middle part 24 of the solid electrolyte layer disposed between the positive electrode powder layer 14 and the negative electrode powder layer 34 and covering the outer periphery of the positive electrode powder layer 14; and the upper part 23 of the solid electrolyte layer disposed on the outer periphery of the above negative electrode powder layer 34 (an example of the outer peripheral powder layer 23).

The above positive electrode collector 10 and the negative electrode collector 30 are pressed in a direction in which the collectors are brought close to each other in the production process, and thereby the above powder laminate 40 is composed of a powder without gaps, that is, densely composed of a powder. The outer side surface 44 of the above powder laminate 40 does not include the contact part between the above powder laminate 40 and the insulating member 11 (not an essential component). The above powder laminate 40 consists of the peripheral edge part 46 including the above outer side surface 44 and the center part 49 surrounded by the peripheral edge part 46. The thickness of the above peripheral edge part 46 is approximately equal to the thickness of the center part 49 (an error in production is included).

The materials of the main component members of the above all-solid state secondary cell 1 will be described.

As the positive electrode collector 10 and the negative electrode collector 30, a thin plate and a foil consist of copper (Cu), magnesium (Mg), stainless steel, titanium (Ti), iron (Fe), cobalt (Co), nickel (Ni), zinc (Zn), aluminum (Al) germanium (Ge), indium (In), lithium (Li), tin (Sn), and their alloys, or a film formed from various materials. The thin plate and the foil have a thickness in the range of 5 μm to 100 μm. The positive electrode collector 10 and the negative electrode collector 30 preferably have their surfaces subjected to a roughening treatment, from the viewpoint of improving the adhesion with the powder laminate 40 composed of a powder. The roughening treatment is a treatment to increase the surface roughness by etching or the like. For the insulating member 11, an insulating sheet made of a polymer material such as a PET film is used.

When the positive electrode collector 10 and the negative electrode collector 30 thus subjected to the etching treatment are used, holes created by etching are crushed by pressing in producing the all-solid state secondary cell 1 and these collectors easily fix on the surfaces of the positive electrode powder layer 14 and the negative electrode powder layer 31, and thus the positive electrode collector 10 and the negative electrode collector 30 are easily integrated with the powder laminate 40.

The positive electrode powder layer 14/the negative electrode powder layer 34 are layers consisting of materials mixed with positive electrode active material/negative electrode active material securing an electron conduction path between particles in order to exchange electrons and a solid electrolyte having ion conductivity at a predetermined ratio. Thus, the positive electrode active material/negative electrode active material are mixed with the solid electrolyte having lithium ion conductivity, thereby providing ion conductivity in addition to electron conductivity and allowing to secure the ion conduction path between particles. The positive electrode powder layer 14/negative electrode powder layer 34 may be a layer consisting of only the positive electrode active material/negative electrode active material.

The positive electrode active material suitable for the positive electrode powder layer 14 is not particularly limited as long as it can intercalate and deintercalate lithium ions. Examples of this positive electrode active material include oxides such as lithium-nickel composite oxide ($LiNi_xM_{1-x}O_2$), lithium cobaltate ($LiCoO_2$), lithium nickelate ($LiNiO_2$), lithium-nickel-cobalt-aluminum composite oxide ($LiNiO_{0.8}Co_{0.15}Al_{0.05}O_2$, NCA layered oxide), lithium manganate (such as spinel lithium manganate $LiMn_2O_4$), and Li-excess composite oxide ($Li_2MnO_3$—$LiMO_2$) and compounds other than oxides. Examples of compounds other than oxides include olivine compounds ($LiMPO_4$), sulfur-containing compounds (such as $Li_2S$), and the like. In the above formulas, M represents a transition metal. The positive electrode active material can be used alone or in combination of two or more materials. From the viewpoint of easily obtaining a high capacity, a lithium-containing oxide including at least one selected from the group consisting of Co, Ni, and Mn is preferable. The lithium-containing oxide may further include a typical metal element such as Al.

The surface of the above positive electrode active material may be coated with a coating material, from the viewpoint of improving rate properties. Specific examples of the coating material include $Li_4Ti_5O_{12}$, $LiTaO_3$, $Li_4NbO_3$, $LiAlO_2$, $Li_2ZrO_3$, $Li_2WO_4$, $Li_2TiO_3$, $Li_2B_4O_7$, $Li_3PO_4$, $Li_2MoO_4$, $LiBO_2$, alumina ($Al_2O_3$), or carbon (C).

On the other hand, as the negative electrode active material suitable for the negative electrode powder layer 34, the material mixed with the negative electrode active material and the lithium ion conductive solid electrolyte is used, or the negative electrode active material is used alone. The negative electrode active material is not particularly limited as long as lithium ions can be intercalated and deintercalated, and known negative electrode active materials used in all-solid cells can be used. Examples of the negative electrode active material include carbonaceous materials capable of intercalating and deintercalating lithium ions, and simple substances of metals or semimetals, alloys, compounds, and the like capable of intercalating and deintercalating lithium ions. Examples of the carbonaceous material include graphite (such as natural graphite and artificial graphite), hard carbon, amorphous carbon, and the like. Examples of simple substances of metals or semimetals and alloys include lithium metals or alloys, a simple substance of Si, and the like. Examples of the compound include oxides, sulfides, nitrides, hydrates, silicides (such as lithium silicide), and the like. Examples of the oxide include titanium oxide and silicon oxide. The negative electrode active material may be used alone or in combination of two or more. For example, silicon oxide and carbonaceous material may be used in combination. Particularly, coated particles including graphite particles and amorphous carbon coating the graphite particles are more preferable. Using graphite with low crystal orientation results in occurrence of expansion and contraction uniformly in multiple directions, and can reduce capacitance drop due to repeated charge and discharge. Using coated particles results in intercalating and deintercalating lithium ions over the entire surface of the particles, and can facilitate interfacial reaction. Therefore, even when the restraint jig is not used under atmospheric pressure, reduction in charge and discharge capacity can be suppressed.

The solid electrolyte is roughly classified into an organic polymer electrolyte (also referred to as an organic solid electrolyte), an inorganic solid electrolyte, and the like, but any of these solid electrolytes may be used. The inorganic solid electrolyte is roughly classified into an oxide-based material and sulfide-based material, and any of these materials may be used. The inorganic solid electrolyte can be appropriately selected from crystalline or amorphous ones. That is, the solid electrolyte can be appropriately selected from materials consisting of an organic compound, an inorganic compound, or a mixture thereof. Specific examples of materials capable of being used as the solid electrolyte include a lithium ion conductive solid electrolyte or a sulfide inorganic solid electrolyte known to have higher ion conductivity than other inorganic compounds. Other examples of the material capable of being used as a solid electrolyte include a lithium-containing metal oxide (one or more metals) such as $Li_2$—$SiO_2$ and $Li_2$—$SiO_2$—$P_2O_5$; a lithium-containing metal nitride such as $Li_xP_yO_{1-z}N_2$; a lithium-containing sulfide glass such as $Li_2S$—$P_2S_5$ system, $Li_2S$—$SiS_2$ system, $Li_2S$—$B_2S_3$ system, $Li_2S$—$GeS_2$ system, $Li_2S$—$SiS_2$—$LiI$ system, $Li_2S$—$SiS_2$—$Li_3PO_4$ system, $Li_2S$—$Ge_2S_2$ system, $Li_2S$—$GeS_2$—$P_2S_5$ system, $Li_2S$—$GeS_2$—$ZnS$ system; and a lithium-containing transition metal oxide such as PEO (polyethylene oxide), PVDF (polyvinylidene fluoride), lithium phosphate ($Li_3PO_4$), and lithium titanium oxide. As the inorganic solid electrolyte, a sulfide (sulfide inorganic solid electrolyte) is preferable. Preferable examples of the sulfide include $Li_2S$ and one or more sulfides including at least one element selected from the group consisting of group 13 elements, group 14 elements, and group 15 elements of the periodic table. The group 13 to 15 elements of the periodic table are not particularly limited, but examples thereof include P, Si, Ge, As, Sb, Al, or the like, and P, Si, and Ge are preferable, and P is particularly preferably. The sulfide including these elements (particularly, P) and Li are also preferable. The solid electrolyte suitable for the solid electrolyte layers 23 and 24 may be the same as or different from the solid electrolyte used in the positive electrode powder layer 14 and the negative electrode powder layer 34.

The positive electrode active material, the negative electrode active material, and the solid electrolyte are not limited to the above materials, and materials generally used in the field of cells can also be used.

Hereinafter, the production method of the above all-solid state secondary cell 1 is described based on FIG. 3 to FIG. 8.

Figure 3:
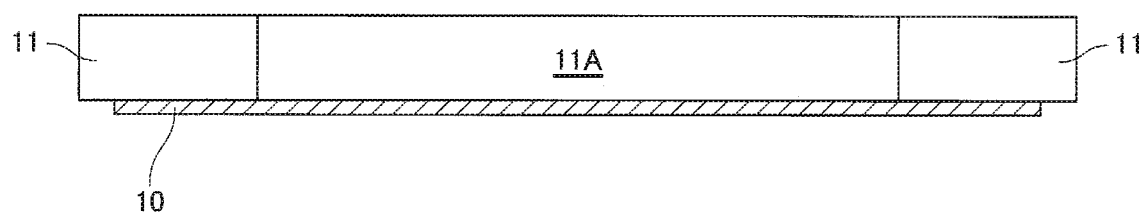
FIG. 3 is a cross-sectional view showing the production method of the all-solid state secondary cell according to Embodiment 1 of the present invention, and shows a step of bonding the insulating member to the positive electrode collector.

As shown in FIG. 3, the insulating member 11 in which the opening part 11A is formed is bonded to the surface of the positive electrode collector 10. The opening part 11A of the insulating member 11 is a space in which the powder laminate 40 is disposed, and is inserted from the outer periphery of the powder laminate 40, and has the size such that the opening part 11A is not contact with the positive electrode powder layer 14 of the powder laminate 40.

Figure 4:
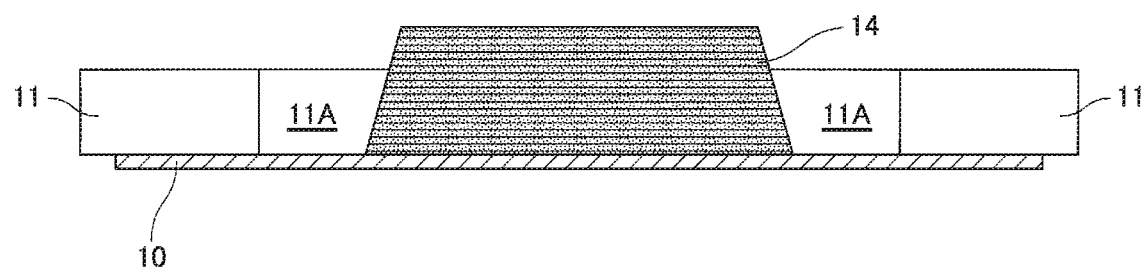
FIG. 4 is a cross-sectional view showing the same production method, and shows a step of disposing the positive electrode powder layer.

Thereafter, as shown in FIG. 4, the positive electrode powder layer 14 is disposed in the opening part 11A of the insulating member 11. Since the positive electrode powder layer 14 is later pressed in the thickness direction, the positive electrode powder layer 14 is shaped in consideration of the deformation due to the pressing.

Figure 5:
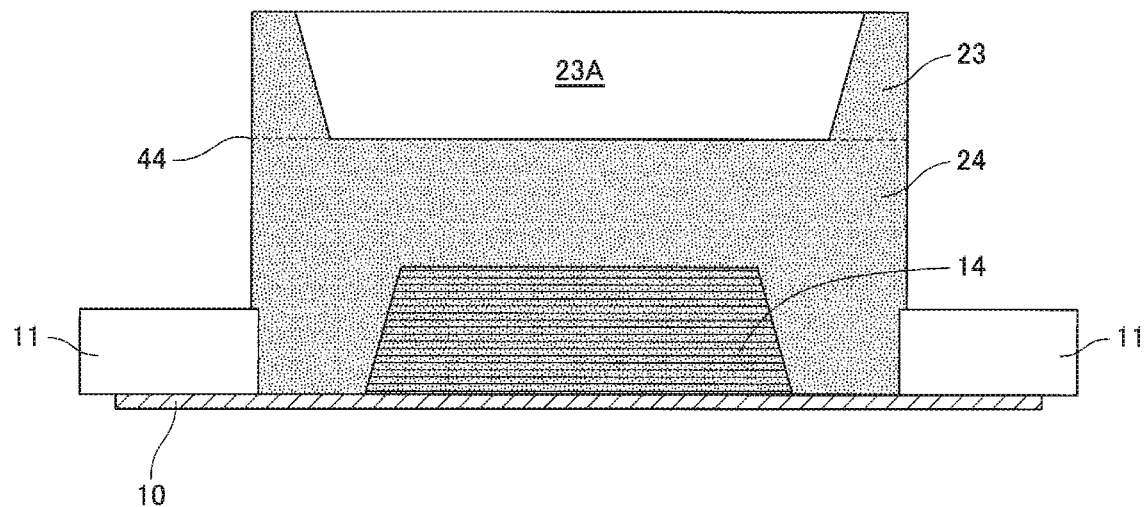
FIG. 5 is a cross-sectional view showing the same production method, and shows a step of disposing the solid electrolyte layer.

Thereafter, as shown in FIG. 5, the solid electrolyte layers 23 and 24 are disposed on the insulating member 11 and the positive electrode powder layer 14 disposed in the opening part 11A of the insulating member 11. The disposing the solid electrolyte layers 23 and 24 is divided into two steps. These two steps consist of: disposing the lower part and middle part 24 of the solid electrolyte layer on the surface (upper surface) of the insulating member 11 so as to bury the positive electrode powder layer 14 disposed in the opening part 11A of the insulating member 11; and disposing the upper part 23 of the solid electrolyte layer on the surface (upper surface) of the middle part 24 of the solid electrolyte layer so as to cover the space part 23A and the outer periphery of the space part 23A. Instead of dividing the disposing the solid electrolyte layers 23 and 24 into such two steps, one step may be used, that is, the solid electrolyte layers 23 and 24 may be disposed while the thicknesses of the solid electrolyte layers 23 and 24 are different. A specific example of the one step includes using of the openings of the screen different between the peripheral edge part 46 and the center part 49 in order to make the thickness of the formed layer different in the film formation by the electrostatic method.

Figure 6:
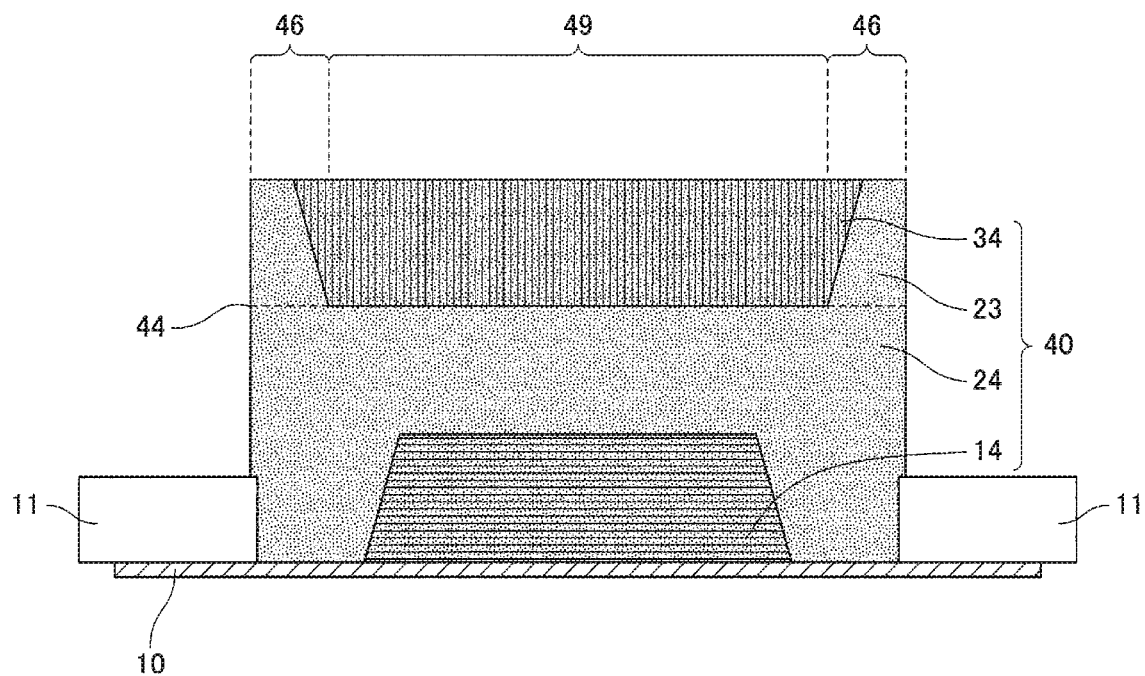
FIG. 6 is a cross-sectional view showing the same production method, and shows a step of disposing the negative electrode powder layer.

Thereafter, as shown in FIG. 6, the negative electrode powder layer 34 is disposed in the space part 23A, the outer periphery of which is covered by the upper part 23 of the solid electrolyte layer. The powder laminate 40 is formed by disposing the negative electrode powder layer 34. The powder laminate 40 consists of the peripheral edge part 46 including the outer side surface and the center part 49 surrounded by the peripheral edge part 46. In disposing the negative electrode powder layer 34, the thickness of the peripheral edge part 46 is substantially equal to the thickness of the center part (an error in production is included). In other words, in the powder laminate 40, the surface of the upper part 23 of the solid electrolyte layer and the surface of the negative electrode powder layer 34 are substantially flat (an error in production is included).

Figure 7:
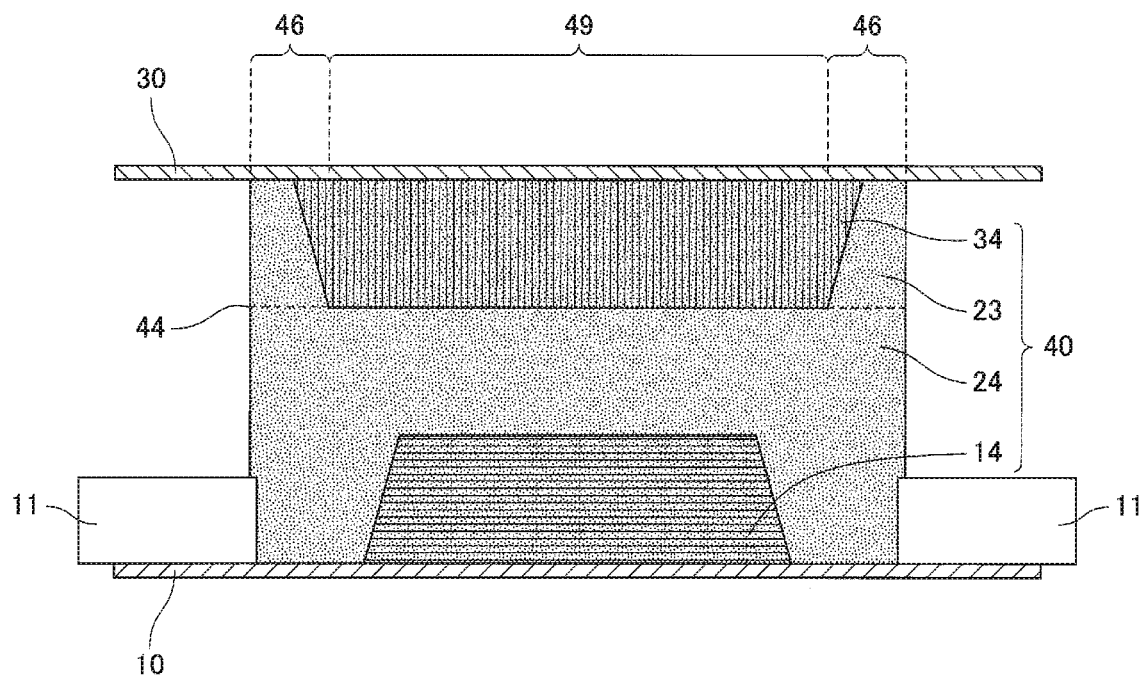
FIG. 7 is a cross-sectional view showing the same production method, and shows a step of disposing the negative electrode collector.

Thereafter, as shown in FIG. 7, the negative electrode collector 30 is disposed on the surface of the upper part 23 of the solid electrolyte layer and on the surface of the negative electrode powder layer 34 which are substantially flat.

Figure 8:
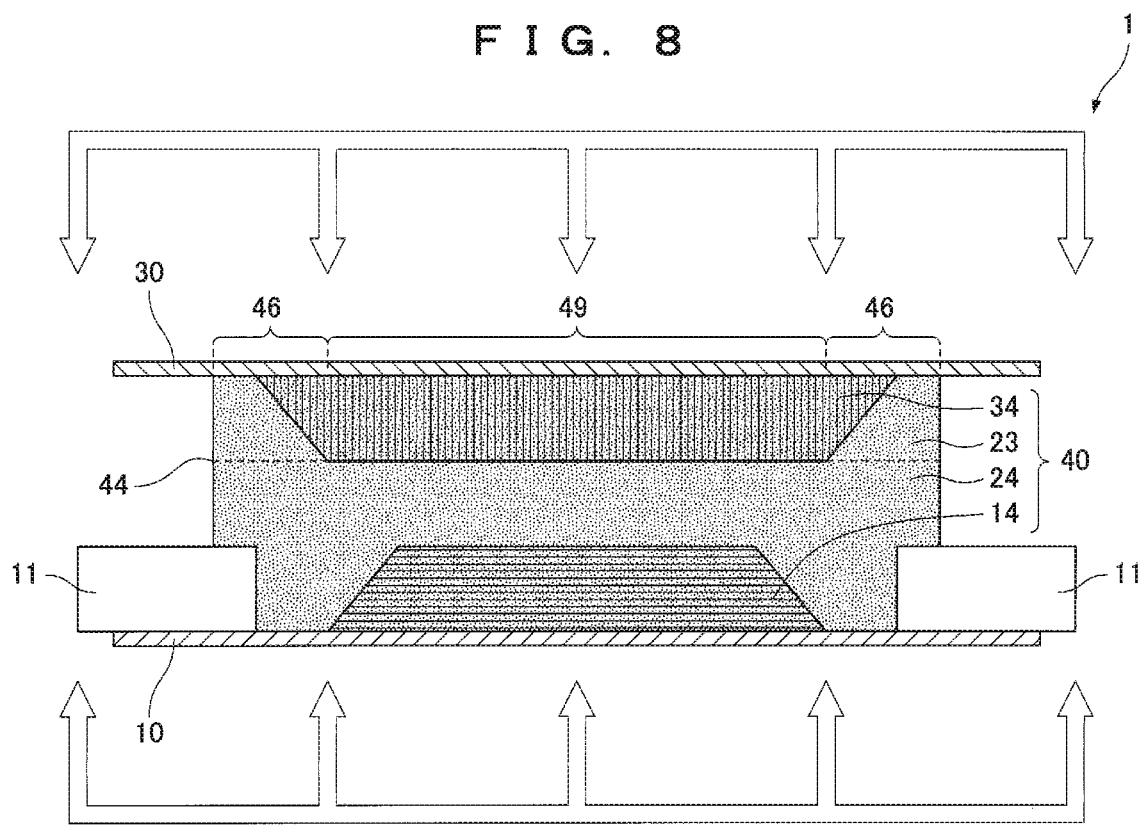
FIG. 8 is a cross-sectional view showing the same production method, and shows a step of pressing.

Finally, as shown in FIG. 8, the positive electrode collector 10 and the negative electrode collector 30 are pressed with a high pressure of several hundred MPa or greater in the direction in which the collectors are brought close to each other. Due to this pressing, the powder laminate 40 becomes thinner and spreads in the direction orthogonal to the thickness direction, and the powder laminate 40 is composed of powder without gaps, that is, the powder laminate 40 is densely made of powder. The above pressing provides the all-solid state secondary cell 1 as shown in FIG. 1.

According to the above all-solid state secondary cell and the production method of the same, the outer peripheries of the positive electrode powder layer 14 and the negative electrode powder layer 34 are covered by the solid electrolyte layers 23 and 24, and the thickness of the peripheral edge part 46 is equal to the thickness of the center part 49, allowing to prevent a short circuit between the positive and negative electrodes.

Since the outer peripheral powder layer 23 becomes the upper part 23 of the solid electrolyte layer, the positive electrode powder layer 14 and the negative electrode powder layer 34 are electrically isolated sufficiently to prevent a short circuit between the positive and negative electrodes, and cell performance can be further improved.

Embodiment 2

In the all-solid state secondary cell 1 according to Embodiment 2 of the present invention, as shown in FIG. 2, the thickness of the peripheral edge part 46 is greater than that of the center part 49.

The following description focuses on the thickness of the powder laminate 40 which is a part different from the first embodiment, and the same reference numerals are given to the same configuration as the above Embodiment 1, and the description thereof will be omitted.

The all-solid state secondary cell according to Embodiment 2 of the present invention is hard to be collapsed by increasing the thickness of the peripheral edge part 46, which is a relatively collapsible part, over the center part 49, which is a part being relatively hard to be collapsed.

Hereinafter, the production method of the all-solid state secondary cell 1 according to Embodiment 2 of the present invention will be described based on FIG. 9 and FIG. 10.

Figure 9:
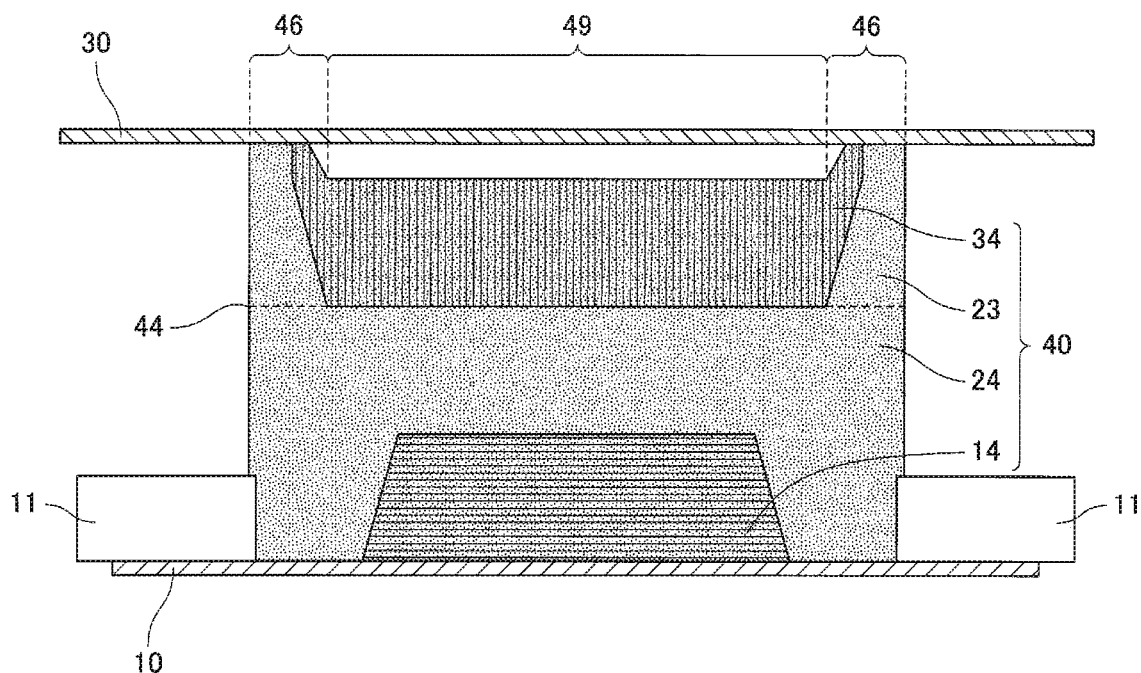
FIG. 9 is a cross-sectional view showing the production method of the all-solid state secondary cell according to Embodiment 2 of the present invention, and shows a step of disposing the negative electrode collector.

As shown in FIG. 9, the upper part 23 of the solid electrolyte layer according to Embodiment 2 of the present invention is disposed to be higher than the upper surface of the negative electrode powder layer 34 disposed thereafter (or already disposed). On the other hand, the negative electrode powder layer 34 according to Embodiment 2 of the present invention is disposed to be lower than the upper surface of the upper part 23 of the solid electrolyte layer already disposed (or disposed thereafter). That is, the upper part 23 of the solid electrolyte layer and the negative electrode powder layer 34 are disposed such that the thickness of the peripheral edge part 46 is greater than the thickness of the center part 49.

Thereafter, the negative electrode collector 30 is disposed on the surface of the upper part 23 of the solid electrolyte layer and on the surface of the negative electrode powder layer 34.

Figure 10:
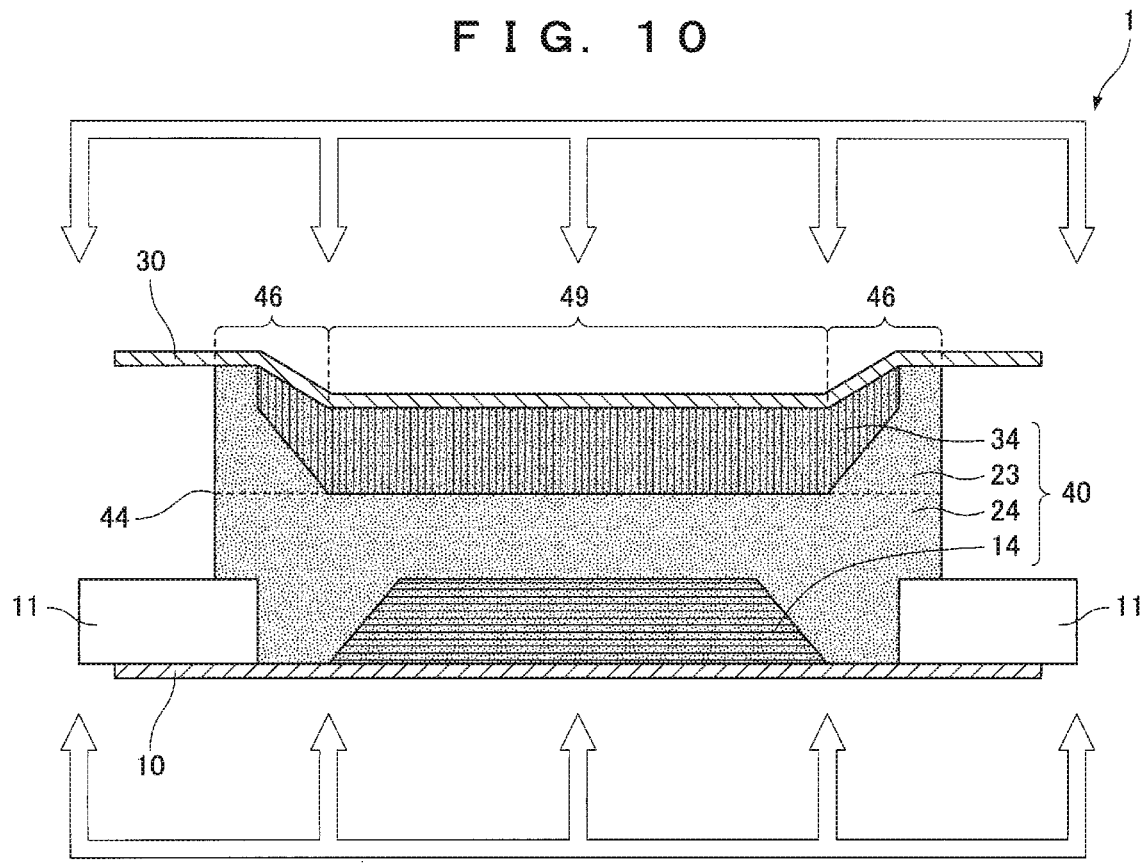
FIG. 10 is a cross-sectional view showing the same production method, and shows a step of pressing.

Finally, as shown in FIG. 10, the positive electrode collector 10 and the negative electrode collector 30 are pressed by an elastic body having a flat press surface with a high pressure of several hundred MPa or greater in the direction in which the collectors are brought close to each other. Due to this pressing, the powder laminate becomes thinner and spreads in the direction orthogonal to the thickness direction, and the powder laminate 40 is composed of powder without gaps, that is, the powder laminate 40 is densely composed of powder. The relatively thick peripheral edge part 46 and the relatively thin center part 49 are pressed by the elastic body having a flat press surface via the negative electrode collector 30. The thicker peripheral edge part 46 is pressed more tightly than the thinner center part 49, and is compacted more tightly. Therefore the peripheral edge part 46 is secured to be hard to be collapsed not only due to being thicker than the center part 49, but also due to being compacted more tightly than the center part 49. As a result, the peripheral edge part 46 is as hard to be collapsed as the center part 49 or is harder to be collapsed than the center part 49.

According to the all-solid state secondary cell 1 according to Embodiment 2 of the present invention and the production method of the same, there are the effects in Embodiment 1 and the peripheral edge part 46 which is a collapsible part becomes harder to be collapsed, allowing to further prevent a short circuit between the positive and negative electrodes.

Hereinafter, specific Examples 1 and 2 of the present invention and Comparative Examples 1 and 2 will be described. Differences between the following Examples (Examples 1 and 2) and Comparative Examples (Comparative Examples 1 and 2) are such that in the Examples, the outer peripheral powder layer 23 covering the outer periphery of the negative electrode powder layer 34 is present as the upper part 23 of the solid electrolyte layer, while in the Comparative Examples, the outer peripheral powder layer 23 is not present. The examples described below, unless otherwise specified, are the same as those described in the above Embodiment 2.

Example 1

Figure 11:
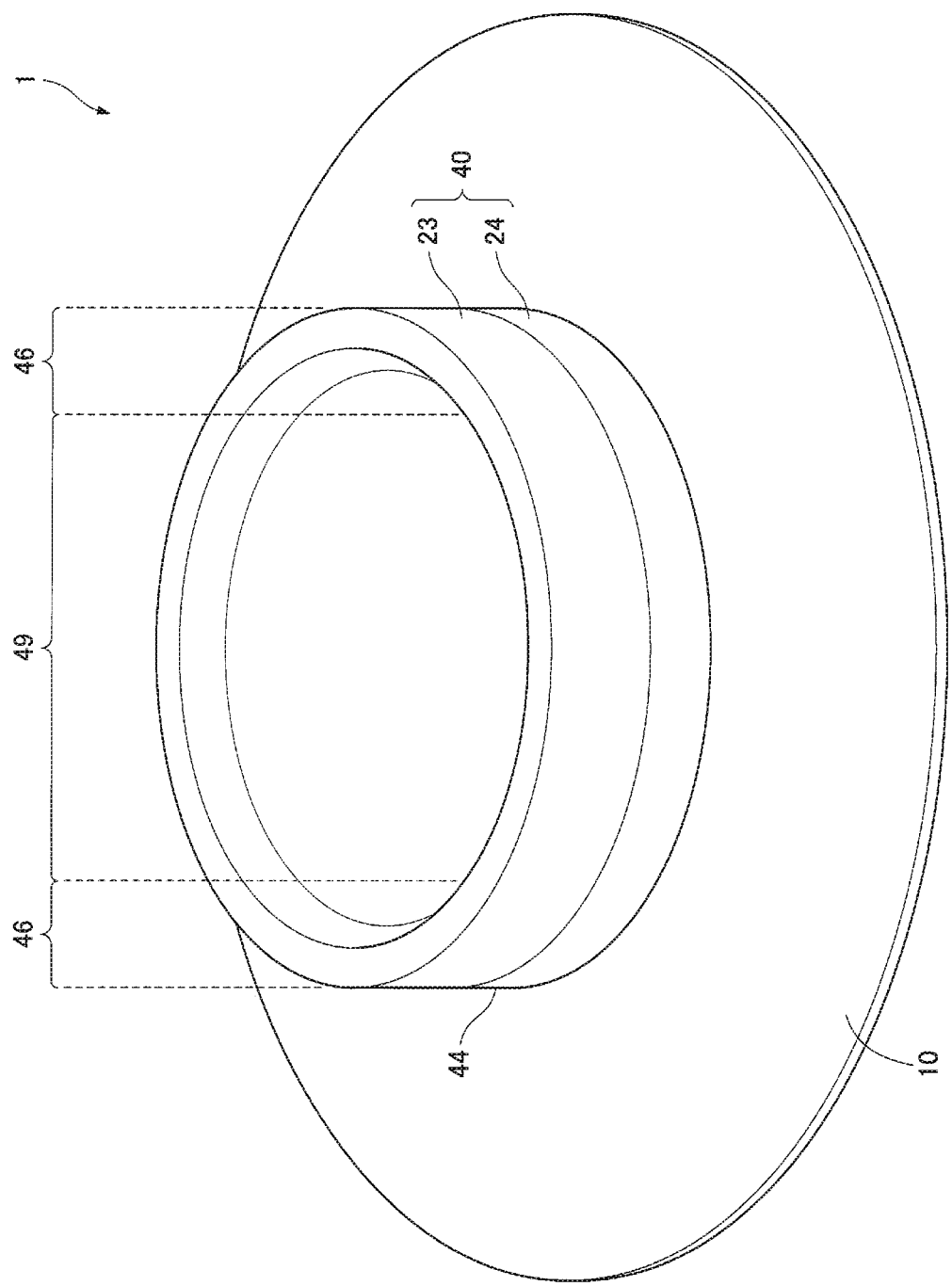
FIG. 11 is a perspective view except the negative electrode collector and the insulating member of the all-solid state secondary cell according to Example 1 of the present invention.
Figure 12:
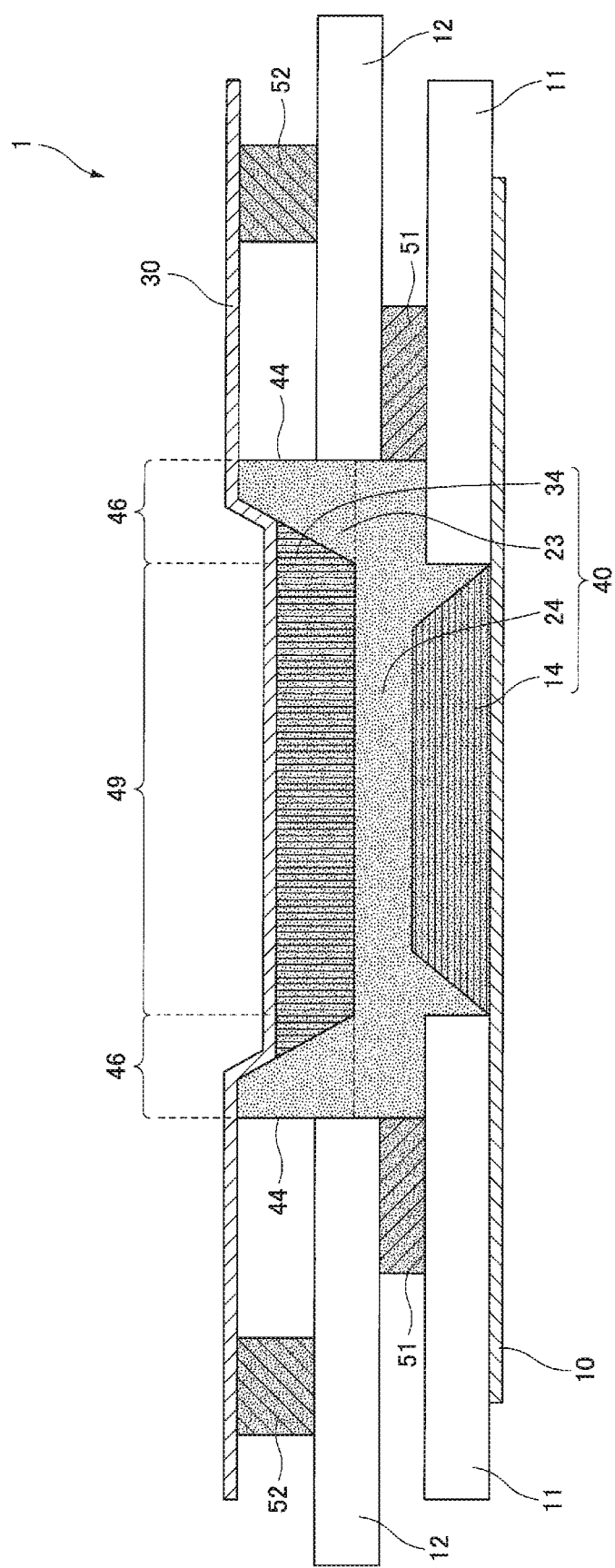
FIG. 12 is a cross-sectional view showing the same all-solid state secondary cell.

In the all-solid state secondary cell 1 according to the present Example 1, as shown in FIG. 11, the powder laminate 40 was made to be a perfect circle in a plan view. In FIG. 11, the negative electrode collector 30 and the insulating member are omitted in order to make the surface of the powder laminate 40 more visible. The all-solid state secondary cell 1 according to the present Example 1 has two insulating members 11 and 12 as shown in FIG. 12. These two insulating members 11 and 12 are composed of the first insulating member 11 which is the same as the insulating member 11 in the above Embodiment 2, and the second insulating member 12 positioned above this first insulating member 11. The second insulating member 12 is disposed in contact with the boundary between the upper part 23 and the middle part 24 of the solid electrolyte layer on the outer side surface 44 of the powder laminate 40. The above all-solid state secondary cell 1 has the first adhesive layer 51 disposed between the first insulating member 11 and the second insulating member 12; and the second adhesive layer 52 disposed between the second insulating member 12 and the negative electrode collector 30.

As the positive electrode collector 10, etched aluminum with a thickness of 20 μm was used. On the other hand, as the positive electrode powder layer 14, a mixture of the positive electrode active material and the lithium ion conductive solid electrolyte at a weight ratio of 7:3 was used. The above positive electrode active material was $LiNi_{0.8}Co_{0.15}Al_{0.05}O_2$, and the lithium ion conductive solid electrolyte was $Li_2S$ (70 mol %)-$P_2S_5$ (30 mol %). The positive electrode powder layer 14 was formed into a film on the positive electrode collector 10 by charging due to corona discharge of that powder material and spraying with an inert gas, and disposed so as to have φ50 mm and a thickness of 100 μm after pressing.

As the solid electrolyte layer 24, $Li_2S$ (70 mol %)-$P_2S_5$ (30 mol %) was used. The lower part and middle part 24 of the solid electrolyte layer were disposed so as to have φ54 mm and a thickness of 75 μm after pressing. Thereafter, the upper part 23 of the solid electrolyte layer was disposed only at the part of φ54 to 52 (the space part 23A at less than φ52), and at the thickness of 150 μm after pressing.

As the negative electrode powder layer 34, a mixture of the negative electrode active material and the lithium ion conductive solid electrolyte at a weight ratio of 6:4 was used. The negative electrode active material was graphite, and the lithium ion conductive solid electrolyte was (70 mol %)-$P_2S_5$ (30 mol %). The negative electrode powder layer 34 was disposed so as to have φ52 mm and a thickness of 100 μm after pressing. On the other hand, as the negative electrode collector 30, a copper foil being subjected to roughening treatment and having a thickness of 18 μm was used.

A double-sided adhesive tape was used as the first adhesive layer 51 and the second adhesive layer 52.

When charging and discharging the four all-solid state secondary cells 1 produced in this manner, there were three all-solid state secondary cells 1 that were successfully charged and discharged. That is, the success rate of charge and discharge in the all-solid state secondary cell 1 according to the present Example 1 was 75% (3/4).

Comparative Example 1

In the all-solid state secondary cell 1 according to the above Example 1, the all-solid state secondary cell according to Comparative Example 1 does not have a part corresponding to the upper part 23 of the solid electrolyte layer. For this reason, in the all-solid state secondary cell according to Comparative Example 1, the outer periphery of the negative electrode powder layer is not covered with the solid electrolyte layer.

When charging and discharging the four all-solid state secondary cells 1 produced in this manner, there were no all-solid state secondary cells that were successfully charged and discharged. That is, the success rate of charge and discharge in the all-solid state secondary cell according to the present Comparative Example 1 was 0% (0/4).

Example 2

Figure 13:
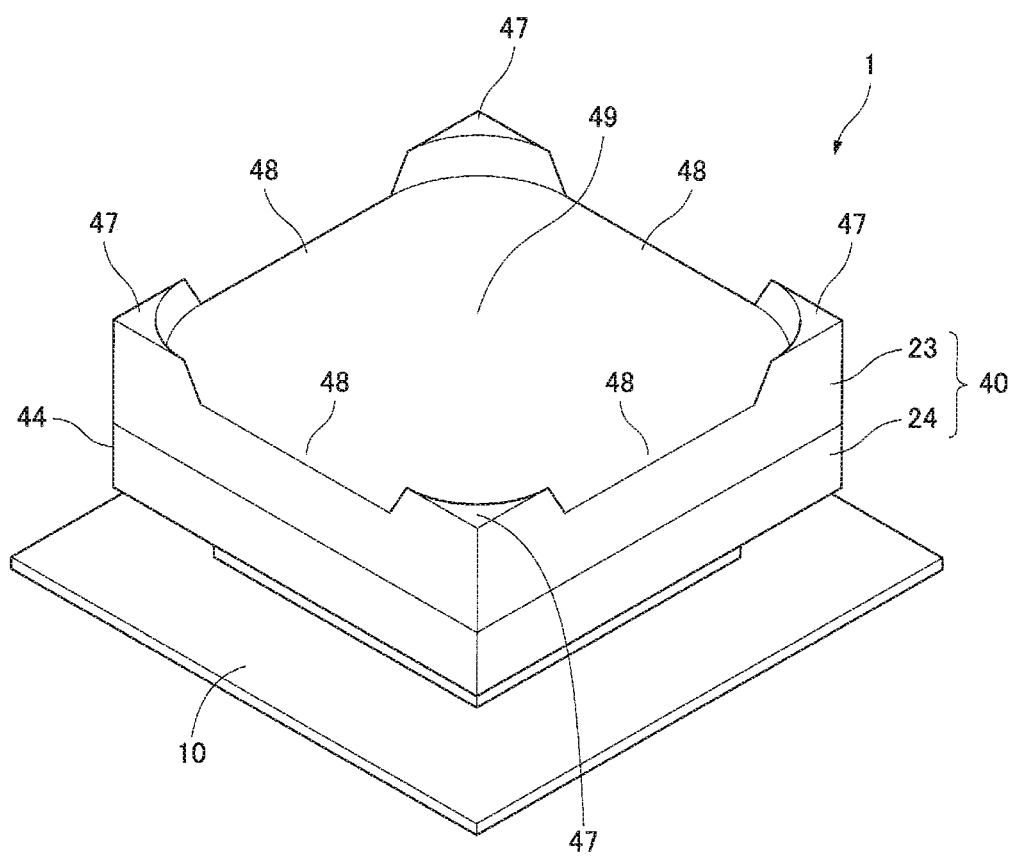
FIG. 13 is a perspective view except the negative electrode collector and the insulating member of the all-solid state secondary cell according to Example 2 of the present invention.
Figure 14:
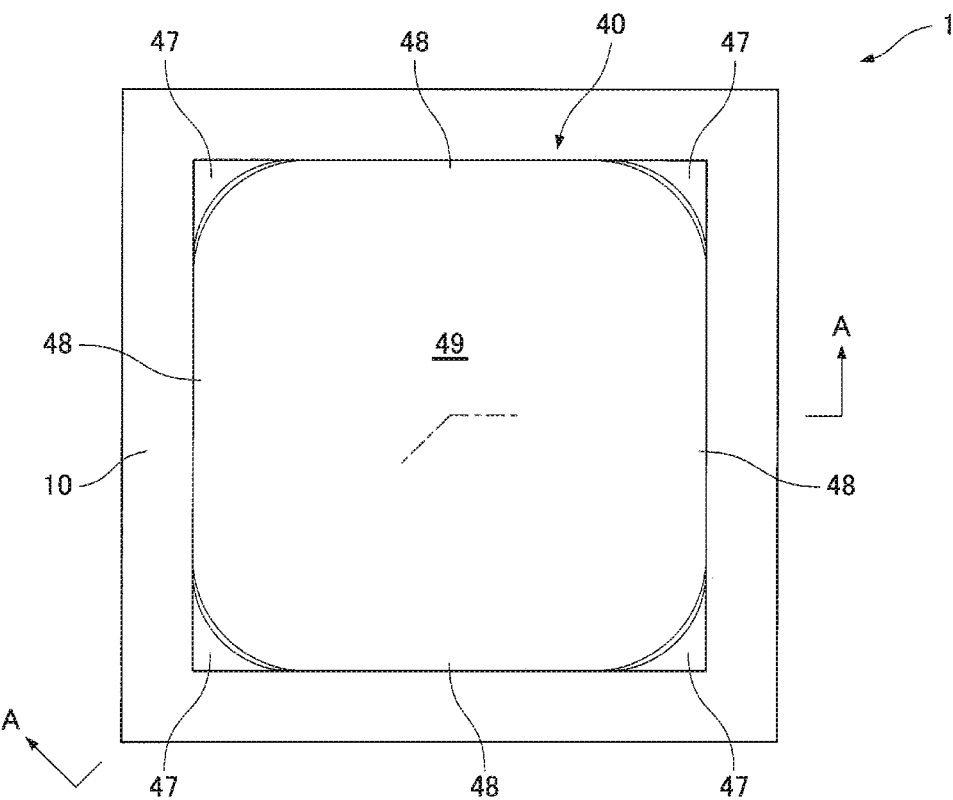
FIG. 14 is a plan view showing the same all-solid state secondary cell.
Figure 15:
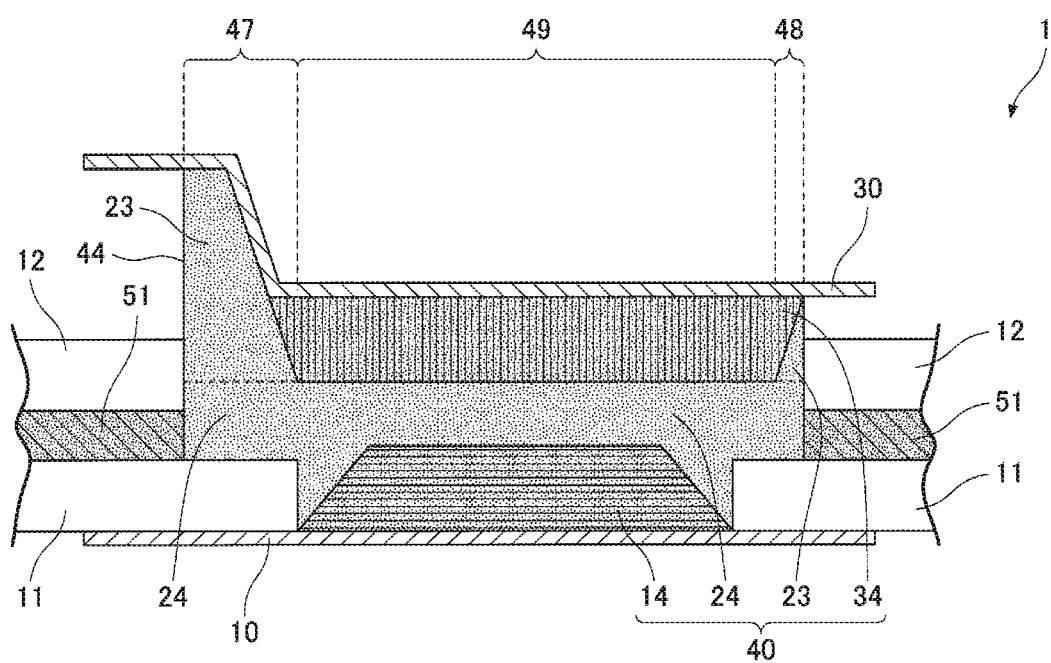
FIG. 15 is a cross-sectional view showing A-A of FIG. 14, wherein the left side shows the cross section which passes along a corner part, and the right side shows cross section which passes along an edge part.

In the all-solid state secondary cell 1 according to the present Example 2, as shown in FIG. 13 and FIG. 14, the powder laminate 40 was made to be a 100 mm square in a plan view. In FIG. 13 and FIG. 14, the negative electrode collector 30 and the insulating members 11 and 12 are omitted in order to make the surface of the powder laminate 40 more visible. The powder laminate 40 of the all-solid state secondary cell 1 according to the present Example 2 is square in plan view, and the peripheral edge part 46 thereof is composed of four corner parts 47 and four side parts 48 located between the adjacent corner parts 47. In the all-solid state secondary cell 1 according to the present Example 2, the corner part 47 was thicker than the side part 48 and the center part 49 respectively, and the thicknesses of the side parts 48 and center part 49 were the same (an error in production was included). The upper part 23 of the solid electrolyte layer, which had a thickness of 150 μm after pressing in the above Example 1, had a thickness of 250 μm after pressing in the corner part 47 of the present Example 2 (refer to left side in FIG. 15), and had a thickness of 100 μm after pressing in the side part 48 in the present Example 2 (refer to right side in FIG. 15). The present Example 2 is the same as the above Example 1 except for the contents described above.

When charging and discharging the five all-solid state secondary cells 1 produced in this manner, there were three all-solid state secondary cells 1 that were successfully charged and discharged. That is, the success rate of charge and discharge in the all-solid state secondary cell 1 according to the present Example 2 was 60% (3/5).

Comparative Example 2

In the all-solid state secondary cell 1 according to the above Example 2, the all-solid state secondary cell according to the present Comparative Example 2 does not have a part corresponding to the upper part 23 of the solid electrolyte layer. For this reason, in the all-solid state secondary cell according to the present Comparative Example 2, the outer periphery of the negative electrode powder layer is not covered with the solid electrolyte layer.

When charging and discharging the five all-solid state secondary cells produced in this manner, there were one all-solid state secondary cells that were successfully charged and discharged. That is, the success rate of charge and discharge in the all-solid state secondary cell according to the present Comparative Example 2 was 20% (1/5).

As apparent from comparison of the success rates of charge and discharge between the above Examples and Comparative Examples, in the all-solid state secondary cell 1 according to the above Examples and the production method of the same, the success rate of charge and discharge was able to be also improved, in other words, a short circuit between positive and negative electrodes was able to be prevented.

In Embodiments 1 and 2 and Examples 1 and 2 described above, the insulating members 11 and 12 which are members disposed on the outer periphery outside the outer side surface 44, the first adhesive layer 51, and the second adhesive layer 52 were not described in detail due to unessential configuration. However, in the case that the positive electrode collector 10 and the negative electrode collector 30 are considered not to be deformed even when pressed in a direction in which the collectors are brought close to each other, the member disposed on the outer periphery outside the outer side surface 44 (hereinafter, referred to as outer peripheral member) also an important configuration. This is because, depending on the pressure difference generated between the powder laminate 40 and the outer peripheral member due to the above pressing, the positive electrode collector 10 and the negative electrode collector 30 which are relatively thin and weak members may be deformed due to bending or the like at the outer side surface 44. Particularly, when the positive electrode collector 10 and the negative electrode collector 30 are thin and weak members such as aluminum or etched aluminum having a thickness of 30 µm or less, the above deformation becomes remarkable.

Embodiment 3

Figure 16:
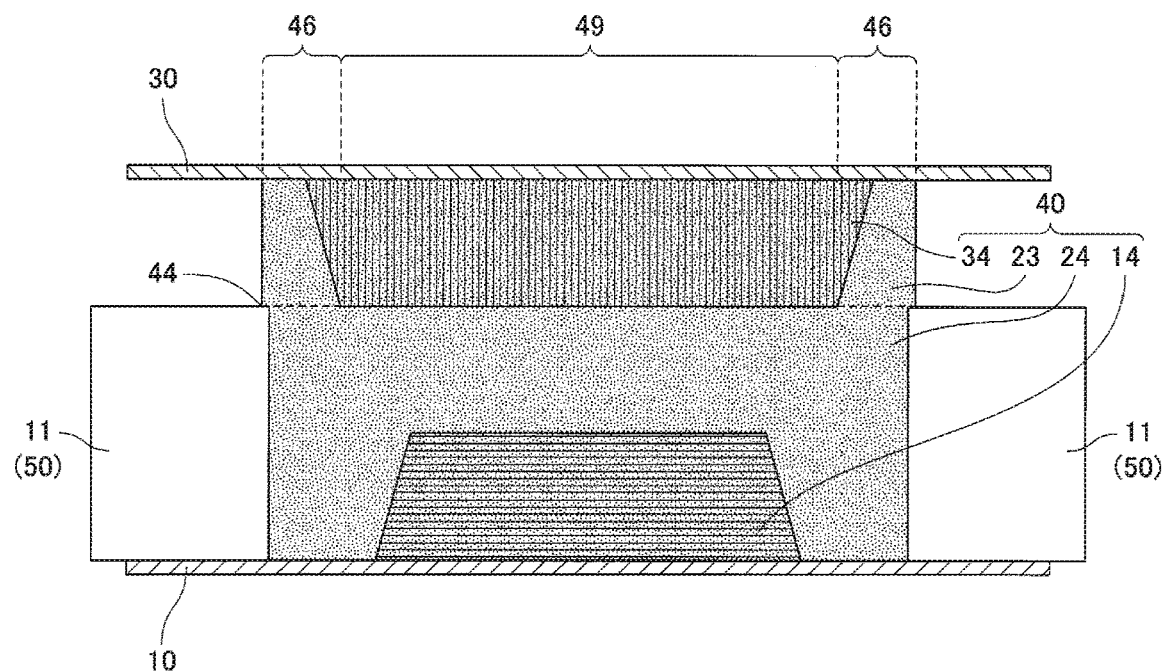
FIG. 16 is a cross-sectional view showing the production method of the all-solid state secondary cell according to Embodiment 3 of the present invention, and shows a step of disposing the negative electrode collector.

Hereinafter, in the case that the positive electrode collector 10 and the negative electrode collector 30 are considered not to be deformed even when pressed in a direction in which the collectors are brought close to each other, the production method of the all-solid state secondary cell 1 according to Embodiment 3 of the present invention will be described based on FIG. 16 to FIG. 18.

The following description focuses on the outer peripheral member which is a part different from the above Embodiments 1 and 2, and the same reference numerals are given to the same configuration as the above Embodiments 1 and 2, and the description thereof will be omitted. Strictly speaking, the outer peripheral member is a member other than the positive electrode collector 10 and the negative electrode collector 30 and disposed on the outer periphery outside the outer side surface 44, and hence corresponds to the insulating member 11 in Embodiment 3 as shown in FIG. 16 and FIG. 17.

Figure 17:
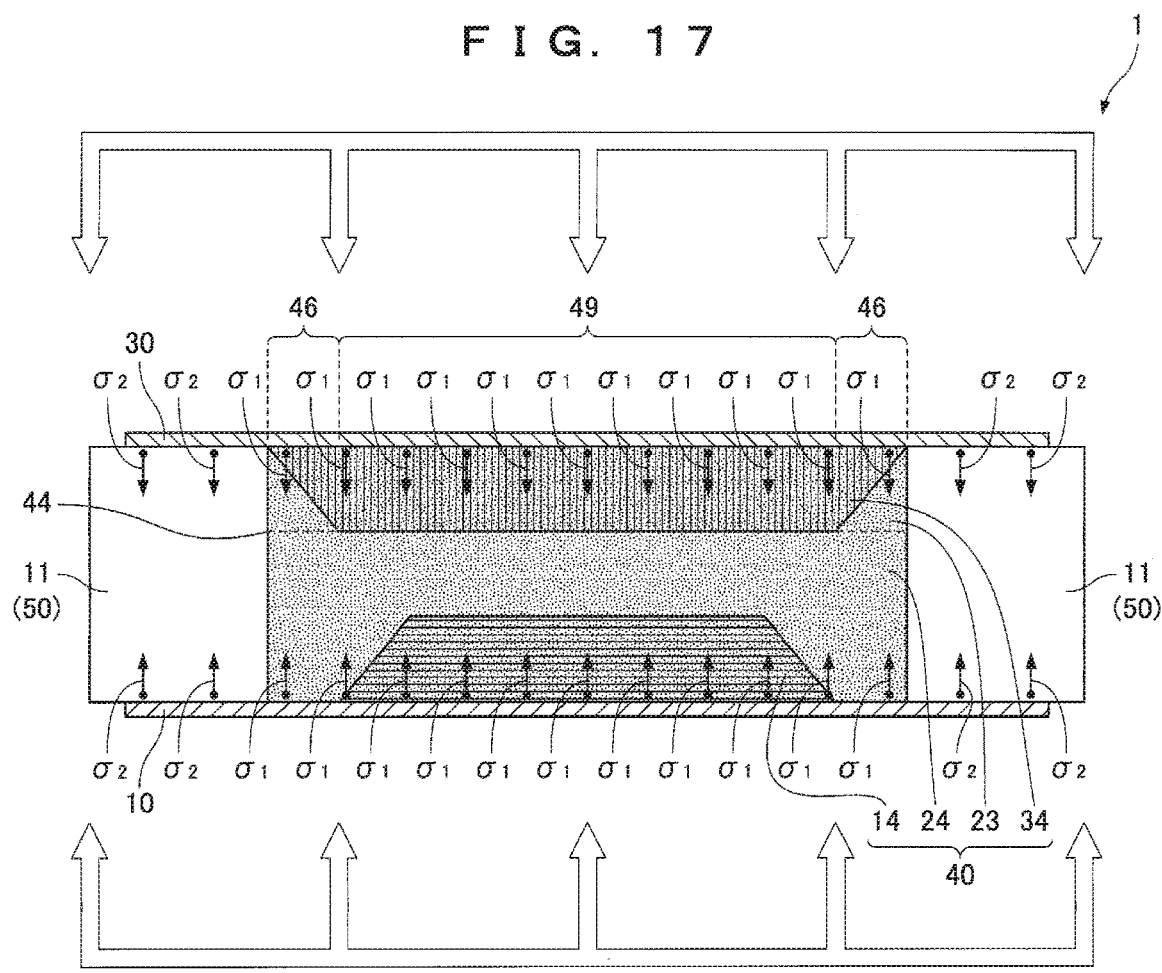
FIG. 17 is a cross-sectional view showing the same production method, and shows a step of pressing.

In the production method of the all-solid state secondary cell 1 according to Embodiment 3 of the present invention, as shown in FIG. 17, the positive electrode collector 10 and the negative electrode collector 30 are pressed in a direction in which the collectors are brought close to each other, thereby generating an equal pressure (σ1=σ2) on both the above powder laminate 40 and the insulating member 11 which is the outer peripheral member 50. In other words, the positive electrode collector 10 and the negative electrode collector 30 are pressed in a direction in which the collectors are brought close to each other, so that the pressure σ1 generated in the powder laminate 40 and the pressure σ2 generated in the insulating member 11 which is the outer peripheral member 50 are equal.

Such pressing is easily achieved by the following method. Specifically, as shown in FIG. 16, before the positive electrode collector 10 and the negative electrode collector 30 are pressed in the direction in which the collectors are brought close to each other, the thickness of the powder laminate 40 is greater than the thickness of the insulating member 11 which is the outer peripheral member 50 disposed on the outer periphery outside the outer side surface 44.

Thereafter, as shown in FIG. 17, the positive electrode collector 10 and the negative electrode collector 30 are pressed in a direction in which the collectors are brought close to each other. In this pressing, the thickness of the powder laminate 40 is made equal to the insulating member 11 which is the outer peripheral member 50, thereby generating an equal pressure (σ1=σ2) on both the above powder laminate 40 and the insulating member 11 which is the outer peripheral member 50.

To realize the above, the following formula (1) is required to be satisfied, wherein the thickness of the above powder laminate 40 before the above pressing is defined as T1, the modulus of elasticity of the above powder laminate 40 as E1, the thickness of the above outer peripheral member 50 before the above pressing as T2, the modulus of elasticity of the above outer peripheral member 50 as E2, and the thickness being equal between the above powder laminate 40 and the above outer peripheral member 50 due to the above pressing as T'.

$$(E1/T1-E2/T2)T'=E1-E2 \qquad (1)$$

The above formula (1) is derived from the formula of mechanics of material. That is, when the modulus of elasticity of the above powder laminate 40 is defined as E1, the compression rate of the powder laminate 40 by the above pressing as ε1 (=σ1/E1), the modulus of elasticity of the above outer peripheral member 50 as E2, and the compression rate of the outer peripheral member 50 by the above pressing as ε2 (=σ2/E2), the thicknesses of the above powder laminate 40 and the insulating member 11 which is the outer peripheral member 50 become equal to be T' in the above pressing, and thereby the following formula (2) is established.

$$T'=(1-ε1)T1=(1-ε2)T2 \qquad (2)$$

Considering that ε1=σ1/E1 and ε2=σ2/E2 are substituted to the above formula (2) and the above powder laminate 40 and the insulating member 11 which is the outer peripheral member 50 generate the same pressure (σ1=σ2), the above formula (1) is introduced.

Therefore, if the materials of the above powder laminate 40 and the outer peripheral member 50 and these thicknesses before the above pressing and after the above pressing satisfying the above formula (1) are selected, in the above pressing, only equalizing the thicknesses T' of the above powder laminate 40 and the insulating member 11 which is the outer peripheral member 50 inevitably generates an equal pressure (σ1=σ2) on both the above powder laminate 40 and the insulating member 11 which is the outer peripheral member 50.

Figure 18:
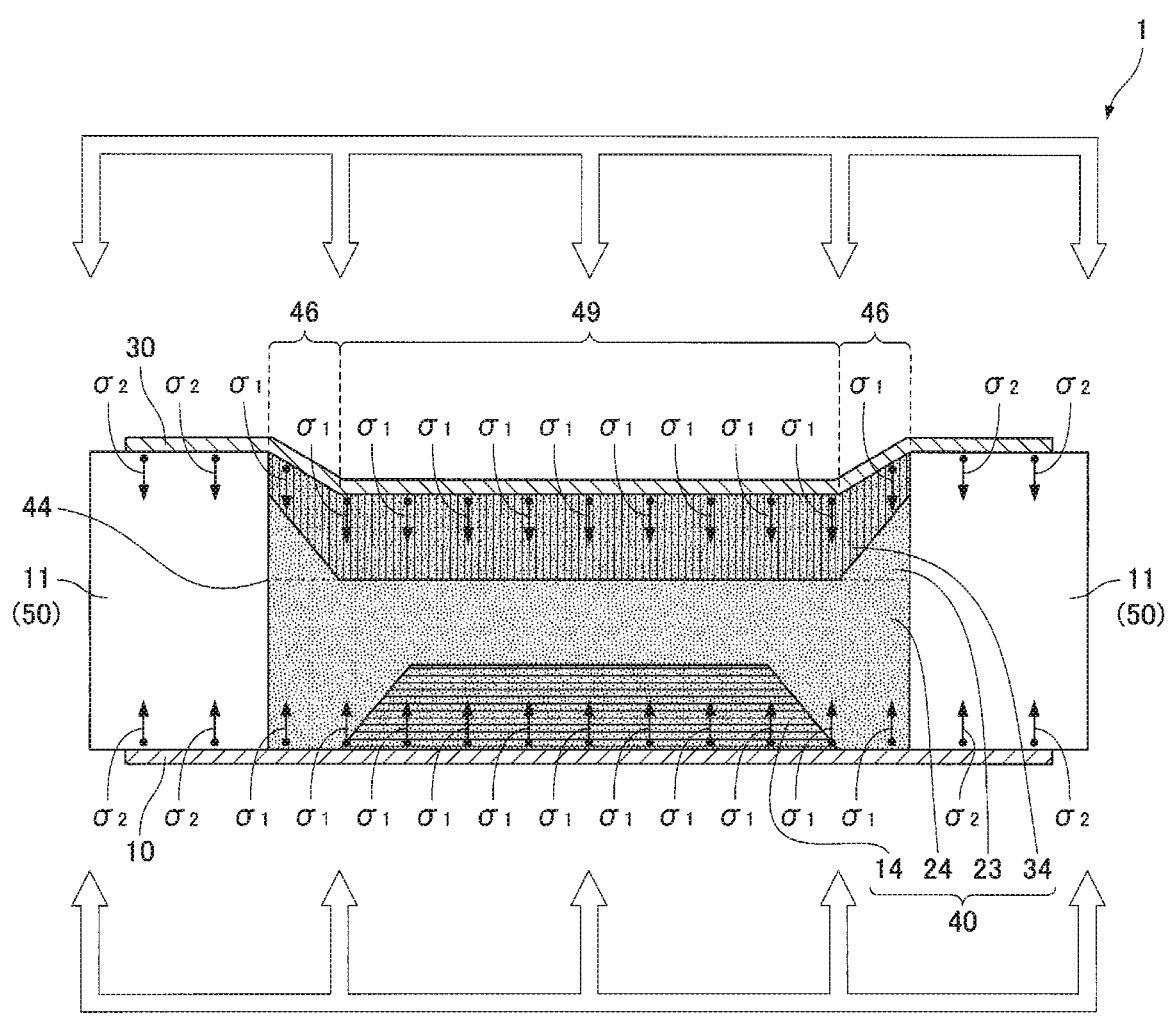
FIG. 18 is a cross-sectional view showing the same production method in case that the all-solid state secondary cell has a thicker center part than a peripheral edge part, and shows a step of pressing.

The above pressing is not limited to the all-solid state secondary cell 1 in which the thickness of the peripheral edge part 46 is equal to the thickness of the center part 49 as shown in FIG. 17, and is also applied for the all-solid state secondary cell 1 in which the thickness of the peripheral edge part 46 as shown in FIG. 18 is greater than the thickness of the center part 49. That is, as shown in FIG. 18, even in such an all-solid state secondary cell 1, the positive electrode collector 10 and the negative electrode collector 30 are pressed in a direction in which the collectors are brought close to each other, thereby generating an equal pressure (σ1=σ2) on both the above powder laminate 40 and the insulating member 11 which is the outer peripheral member Such pressing is easily achieved by the following method. Specifically, in the above pressing, as shown in FIG. 18, the thickness of the thickest part of the powder laminate 40 is made equal to the thickness of the insulating member 11 which is the outer peripheral member 50, thereby generating an equal pressure (σ1=σ2) on both the above powder laminate 40 and the insulating member 11 which is the outer peripheral member 50. To realize the above, the above formula (1) is required to be satisfied, where T1 is the thickness of the thickest part of the above powder laminate 40 before the above pressing and T' is the equal thicknesses of the thickest part of the powder laminate 40 and the peripheral member 50 due to the above pressing.

Hereinafter, Examples 3 to 5 in which the above Embodiment 3 becomes more specific will be described based on FIG. 19 to FIG. 21. In the all-solid state secondary cell 1 according to these Examples 3 to 5, in the above pressing, by equalizing the thicknesses of the thickest part of the above powder laminate 40 and the outer peripheral member 50 and satisfying the above formula (1), thereby generating an equal pressure (σ1=σ2) on both the above powder laminate 40 and the outer peripheral member 50. The all-solid state secondary cells according to Examples 3 to 5 all have the first insulating member 11, the second insulating member 12, the first adhesive layer 51, and the second adhesive layer 52 as the outer peripheral member 50. The examples described below, unless otherwise specified, are the same as those described in the above Embodiment 3.

Example 3

Figure 19:
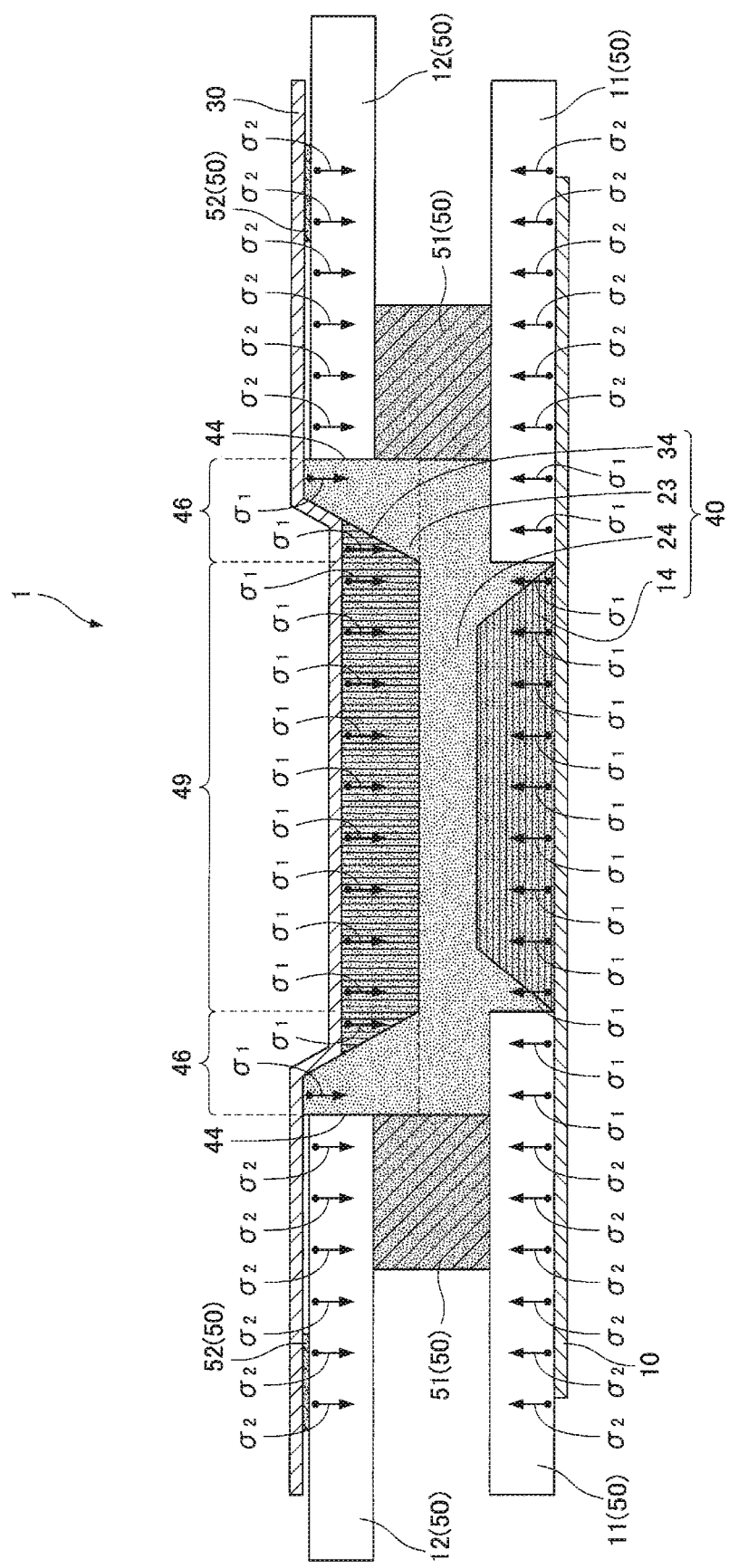
FIG. 19 is a cross-sectional view showing the all-solid state secondary cell according to Example 3 of the present invention.

In the all-solid state secondary cell 1 according to Embodiment 3, as shown in FIG. 19, the thickness of the first insulating member 11 is equal to the thickness of the second insulating member 12, and the thickness of the first adhesive layer 51 is greater than the thickness of the second adhesive layer 52. Each of the thicknesses of the first insulating member 11 and the second insulating member 12 is smaller than the thickness of the positive electrode powder layer 14, and the first adhesive layer 51 is disposed at the height of the boundary between the middle part 24 and the upper part 23 of the solid electrolyte layer.

Example 4

Figure 20:
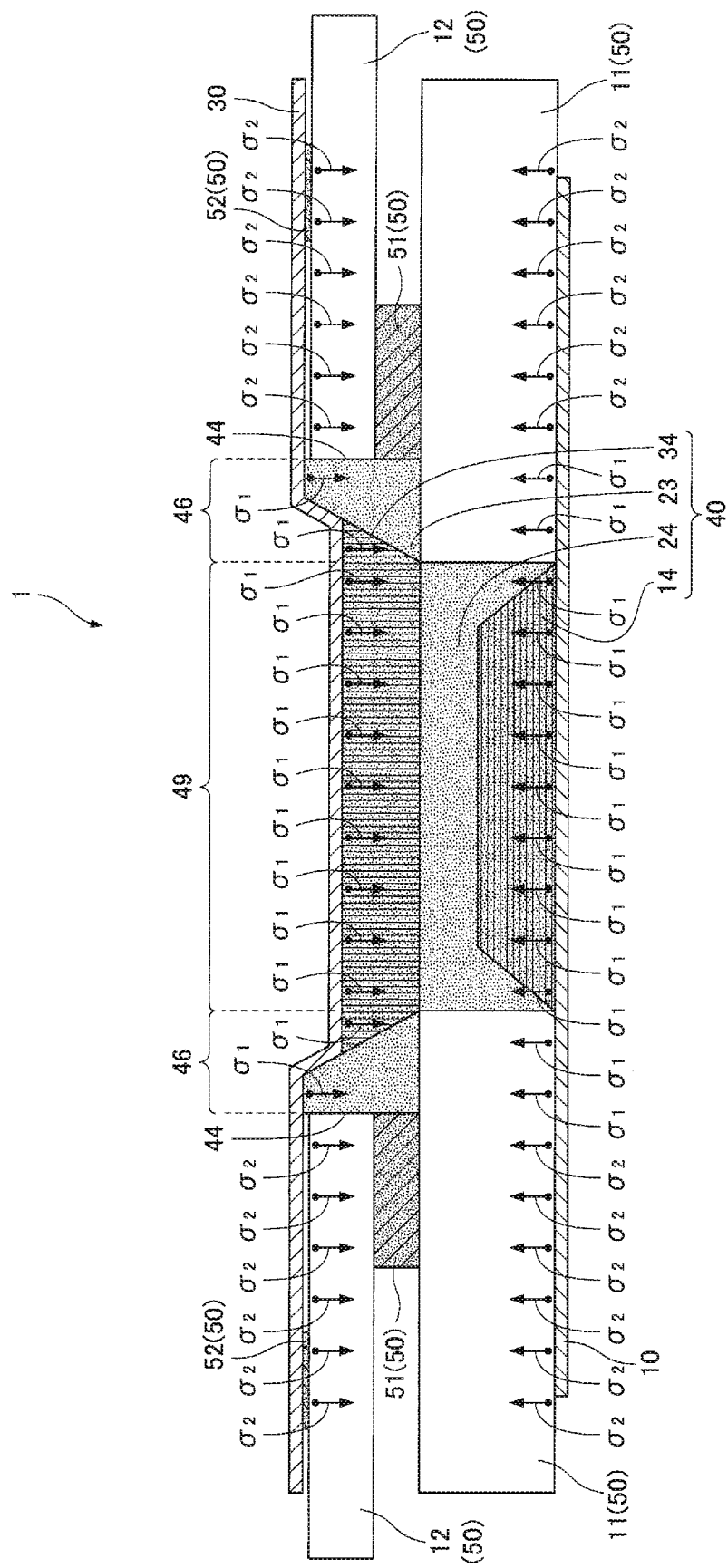
FIG. 20 is a sectional view showing the all-solid state secondary cell according to Example 4 of the present invention.

In the all-solid state secondary cell 1 according to Embodiment 4, as shown in FIG. 20, the thickness of the first insulating member 11 is greater than the thickness of the second insulating member 12, and the thickness of the first adhesive layer 51 is greater than the thickness of the second adhesive layer 52. The thickness of the first insulating member 11 is equal to the thickness of the lower part and middle part 24 of the solid electrolyte layer. The thickness of the second insulating member 12 is smaller than the thickness of the positive electrode powder layer 14.

Example 5

Figure 21:
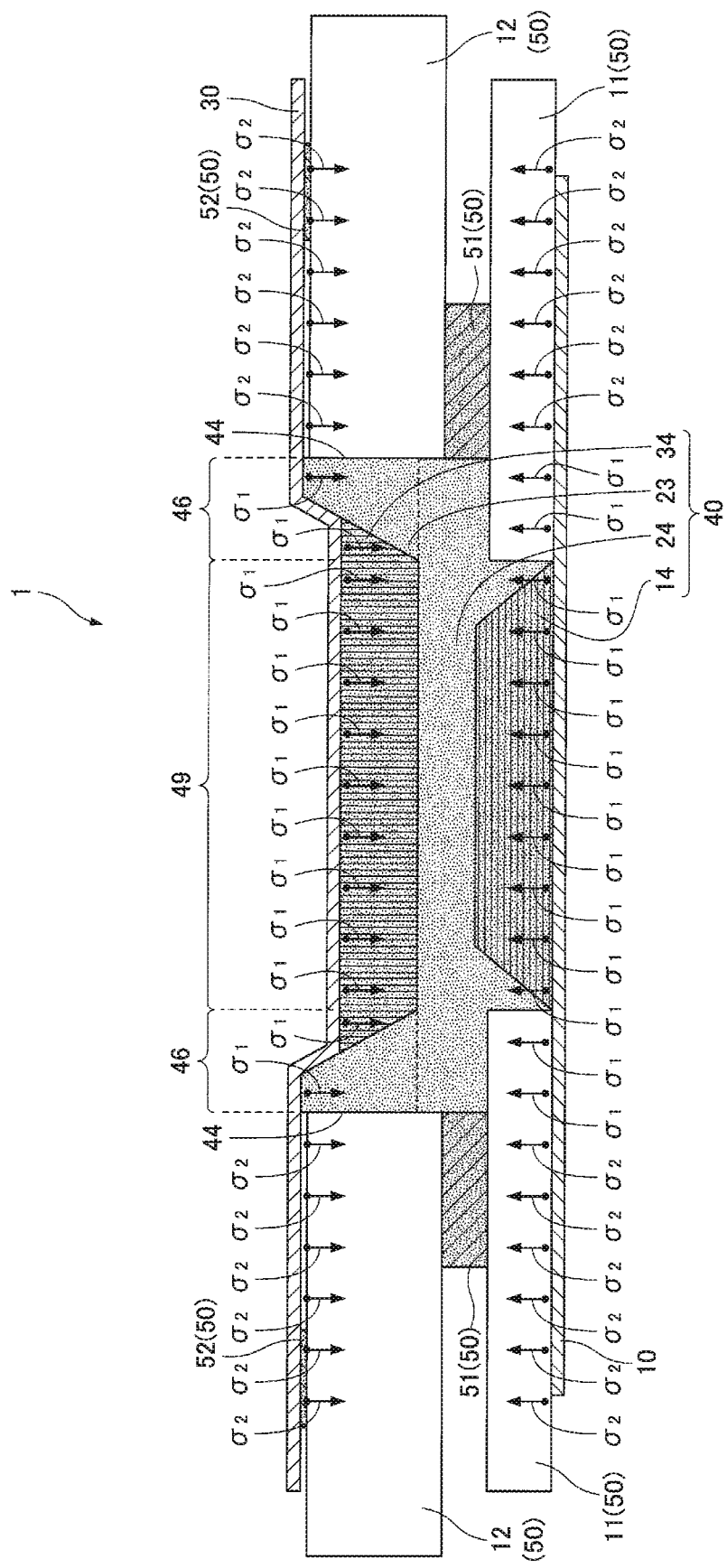
FIG. 21 is a cross-sectional view showing the all-solid state secondary cell according to Example 5 of the present invention

In the all-solid state secondary cell 1 according to the present Example 5, as shown in FIG. 21, the thickness of the first insulating member 11 and the thickness of the second insulating member 12 according to the above Example 4 are interchanged, and other than that is the same as the above Example 4.

Thus, according to the production method of the all-solid state secondary cell 1 according to Embodiment 3 and Examples 3 to 5, the pressure σ1 generated in the powder laminate 40 and the pressure σ2 generated in the outer peripheral member 50 become equal due to the above pressing. For this reason, even when the positive electrode collector 10 and the negative electrode collector 30 are relatively thin and weak members, these collectors are not deformed by the above pressing, and hence a short circuit between positive and negative electrodes can be suppressed.

In the above Embodiments and Examples, the upper part 23 of the solid electrolyte layer has been described as the outer peripheral powder layer 23, and may be the hydrogen sulfide adsorption layer and/or the moisture adsorption layer. The hydrogen sulfide adsorption layer instead of the outer peripheral powder layer 23 adsorbs the dangerous hydrogen sulfide generated when the powder laminate 40 is collapsed, and hence safety can be improved. On the other hand, the moisture adsorption layer instead of the outer peripheral powder layer 23 adsorbs the moisture generated by long-term use, and hence degradation of cell performance due to long-term use can be suppressed. Therefore, the hydrogen sulfide adsorption layer and the moisture adsorption layer instead of the outer peripheral powder layer 23 can improve the safety and can suppress the degradation of the cell performance due to long-term use. Even when the outer peripheral powder layer 23 is the hydrogen sulfide adsorption layer and/or the moisture adsorption layer, the thickness of the peripheral edge part 46 is equal to or greater than the thickness of the center part 49, ensuring the effect that a short circuit between the positive and negative electrodes can be prevented.

The above Embodiments and Examples have described that as the production method of the all-solid state secondary cell 1, the negative electrode powder layer 34 is disposed after the upper part 23 of the solid electrolyte layer is disposed, but the upper part 23 of the solid electrolyte layer may be disposed after the negative electrode powder layer 34 is disposed.

The above Embodiments and Examples have described that the positive electrode powder layer 14 and the positive electrode collector 10, and the negative electrode powder layer 34 and the negative electrode collector 30 have the positional relationship as illustrated, but this positional relationship may be exchanged.

The above Embodiments and Examples have described that the all-solid state secondary cell 1 includes the powder laminate 40 having a perfect circular shape and a square shape in plan view, but the shape of the powder laminate 40 is not limited to these shapes and may be an ellipse, a rectangle, another polygon, or the like in plan view. From the viewpoint of improving the cell performance, it is preferable that the powder laminate 40 has a circular shape (a perfect circle, an elliptical shape, an oval shape, an egg shape, or the like) without the corner part 47 which is a collapsible part.

The invention claimed is:

1. An all-solid state secondary cell comprising:
   a positive electrode collector;
   a negative electrode collector; and
   a powder laminate disposed between the positive electrode collector and the negative electrode collector,
   wherein the powder laminate has a positive electrode powder layer and a negative electrode powder layer, and a solid electrolyte layer disposed between the positive electrode powder layer and the negative electrode powder layer,
   wherein the positive electrode powder layer includes a first positive surface and a second positive surface, the first positive surface being in contact with the positive electrode collector, the second positive surface being in contact with the solid electrolyte layer, the positive electrode powder layer further including a positive surrounding surface connecting the first positive surface and the second positive surface,
   wherein the negative electrode powder layer includes a first negative surface and a second negative surface, the first negative surface being in contact with the negative electrode collector, the second negative surface being in contact with the solid electrolyte layer, the negative electrode powder layer further including a negative surrounding surface connecting the first negative surface and the second negative surface,
   wherein the solid electrolyte layer is configured to surround the positive surrounding surface of the positive electrode powder layer and the negative surrounding surface of the negative electrode powder layer,
   wherein the solid electrolyte layer includes a solid composition and comprises a pressed powder;
   wherein the powder laminate comprises a peripheral edge part and a center part surrounded by the peripheral edge part;
   wherein a thickness of the peripheral edge part of the powder laminate is greater than a thickness of the center part of the powder laminate;

wherein the first positive surface has a larger area than the second positive surface, and the first negative surface has a larger area than the second negative surface;

wherein the solid electrolyte layer includes a first portion surrounding the positive electrode powder layer, a second portion surrounding the negative electrode powder layer, and a third portion between the first and second portions; and wherein the second positive surface is in contact with the third portion without being in contact with the first portion, and the second negative surface is in contact with the third portion without being in contact with the second portion.

2. The all-solid state secondary cell according to claim 1, wherein the first negative surface is flat.

3. The all-solid state secondary cell according to claim 1, wherein the first negative surface is configured to have a concaved portion.

4. The all-solid state secondary cell according to claim 1, wherein the first negative surface is opposite to the second negative surface.

5. The all-solid state secondary cell according to claim 1, further comprising an insulating member disposed on the positive electrode collector or the negative electrode collector, the insulating member having an opening part in which part of the powder laminate is disposed, the insulating member having a first surface and a second surface opposite to the first surface, the first surface being contact with the positive electrode collector or the negative electrode collector, at least part of the second surface being in contact with the solid electrolyte layer of the powder laminate.

6. The all-solid state secondary cell according to claim 1, wherein a thickness of an outer surface of the first portion or the second portion at the peripheral edge part is greater than a thickness of the positive electrode powder layer or the negative electrode powder layer at the center part, and wherein a thickness of an outer surface of the second portion or the first portion at the peripheral edge part being equal to a thickness of the negative electrode powder layer or the positive electrode powder layer at the center part.

7. A production method of an all-solid state secondary cell, wherein the all-solid state secondary cell comprises:
a positive electrode collector;
a negative electrode collector; and
a powder laminate disposed between the positive electrode collector and the negative electrode collector,
wherein the powder laminate has a positive electrode powder layer and a negative electrode powder layer, and a solid electrolyte layer disposed between the positive electrode powder layer and the negative electrode powder layer,
wherein the positive electrode powder layer includes a first positive surface and a second positive surface, the first positive surface being in contact with the positive electrode collector, the second positive surface being in contact with the solid electrolyte layer, the positive electrode powder layer further including a positive surrounding surface connecting the first positive surface and the second positive surface,
wherein the negative electrode powder layer includes a first negative surface and a second negative surface, the first negative surface being in contact with the negative electrode collector, the second negative surface being in contact with the solid electrolyte layer, the negative electrode powder layer further including a negative surrounding surface connecting the first negative surface and the second negative surface, wherein the solid electrolyte layer is configured to surround the positive surrounding surface of the positive electrode powder layer and the negative surrounding surface of the negative electrode powder layer, wherein the solid electrolyte layer includes a solid composition and comprises a pressed powder;

wherein the powder laminate comprises a peripheral edge part and a center part surrounded by the peripheral edge part;

wherein a thickness of the peripheral edge part of the powder laminate is equal to or greater than a thickness of the center part of the powder laminate; and wherein the production method comprises:
bonding an insulating member having an opening part formed therein on a surface of the positive electrode collector or the negative electrode collector;
disposing the positive electrode powder layer or the negative electrode powder layer in the opening part of the insulating member bonded to the surface of the positive electrode collector or the negative electrode collector;
disposing a lower part and middle part of the solid electrolyte layer on a surface of the insulating member so as to bury the positive electrode powder layer or the negative electrode powder layer disposed in the opening part of the insulating member;
disposing an upper part of the solid electrolyte layer on a surface of the middle part of the solid electrolyte layer so as to form a space part and cover an outer periphery of the space part;
disposing the negative electrode powder layer or the positive electrode powder layer in the space part, the outer periphery of which is covered with the upper part of the solid electrolyte layer;
disposing the negative electrode collector or the positive electrode collector on a surface of the upper part of the solid electrolyte layer and on a surface of the negative electrode powder layer or the positive electrode powder layer; and
pressing the positive electrode collector and the negative electrode collector in a direction in which the collectors are brought close to each other.

8. The production method of the all-solid state secondary cell according to claim 7, wherein the all-solid state secondary cell comprises an outer peripheral member disposed on an outer periphery of the powder laminate; and
wherein the pressing the positive electrode collector and the negative electrode collector in a direction in which the collectors are brought close to each other generates an equal pressure on both the powder laminate and the outer peripheral member by the pressing.

9. The production method of the all-solid state secondary cell according to claim 8, wherein the pressing the positive electrode collector and the negative electrode collector in a direction in which the collectors are brought close to each other makes the thickness of the powder laminate equal to the thickness of the outer peripheral member and satisfies the following equation (1):

$$(E1/T1-E2/T2)T'=E1-E2 \tag{1}$$

where T1 is a thickness of the powder laminate before the pressing,
E1 is a modulus of elasticity of the powder laminate,
T2 is a thickness of the outer peripheral member before the pressing, E2 is a modulus of elasticity of the outer peripheral member, and T' is a thickness of the powder laminate to be made equal to the thickness of the outer peripheral member by the pressing.

10. The production method of the all-solid state secondary cell according to claim 7, wherein the first negative surface is flat.

11. The production method of the all-solid state secondary cell to claim 7, wherein the first negative surface is configured to have a concaved portion.

12. The production method of the all-solid state secondary cell to claim 7, wherein the first negative surface is opposite to the second negative surface.

13. A production method of an all-solid state secondary cell, the all-solid state secondary cell comprises:

a positive electrode collector;

a negative electrode collector; and a powder laminate disposed between the positive electrode collector and the negative electrode collector;

wherein the powder laminate has a positive electrode powder layer and a negative electrode powder layer, and a solid electrolyte layer disposed between the positive electrode powder layer and the negative electrode powder layer, wherein the positive electrode powder layer includes a first positive surface and a second positive surface, the first positive surface being in contact with the positive electrode collector, the second positive surface being in contact with the solid electrolyte layer, the positive electrode powder layer further including a positive surrounding surface connecting the first positive surface and the second positive surface, wherein the negative electrode powder layer includes a first negative surface and a second negative surface, the first negative surface being in contact with the negative electrode collector, the second negative surface being in contact with the solid electrolyte layer, the negative electrode powder layer further including a negative surrounding surface connecting the first negative surface and the second negative surface, wherein the solid electrolyte layer is configured to surround the positive surrounding surface of the positive electrode powder layer and the negative surrounding surface of the negative electrode powder layer, wherein the solid electrolyte layer includes a solid composition and comprises a pressed powder;

wherein the powder laminate comprises a peripheral edge part and a center part surrounded by the peripheral edge part;

wherein a thickness of the peripheral edge part of the powder laminate is equal to or greater than a thickness of the center part of the powder laminate; and wherein the production method comprises:

bonding an insulating member having an opening part formed therein on a surface of the positive electrode collector or the negative electrode collector;

disposing the positive electrode powder layer or the negative electrode powder layer in the opening part of the insulating member bonded to the surface of the positive electrode collector or the negative electrode collector;

disposing a lower part and middle part of the solid electrolyte layer on a surface of the insulating member so as to bury the positive electrode powder layer or the negative electrode powder layer disposed in the opening part of the insulating member;

disposing the negative electrode powder layer or the positive electrode powder layer on a surface of the middle part of the solid electrolyte layer;

disposing an upper part of the solid electrolyte layer on the surface of the middle part of the solid electrolyte layer so as to cover an outer periphery of the disposed negative electrode powder layer or the positive electrode powder layer;

disposing the negative electrode collector or the positive electrode collector on a surface of the upper part of the solid electrolyte layer and on a surface of the negative electrode powder layer or the positive electrode powder layer; and pressing the positive electrode collector and negative electrode collector in a direction in which the collectors are brought close to each other.

14. The production method of the all-solid state secondary cell according to claim 13, wherein the first negative surface is flat.

15. The production method of the all-solid state secondary cell to claim 13, wherein the first negative surface is configured to have a concaved portion.

16. The production method of the all-solid state secondary cell to claim 13, wherein the first negative surface is opposite to the second negative surface.

* * * * *